[11] 3,609,312

| [72] | Inventors | Robert K. Higgins<br>Silver Spring;<br>Andrew T. Sheets, Burtonsville, both of Md. |
|---|---|---|
| [21] | Appl. No. | 712,068 |
| [22] | Filed | Mar. 11, 1968 |
| [45] | Patented | Sept. 28, 1971 |
| [73] | Assignee | The United States of America as represented by the Secretary of the Navy |

[54] DATA CONVERSION AND CONTROL SYSTEM
14 Claims, 14 Drawing Figs.
[52] U.S. Cl. .................................................. 235/150.2,
235/153, 235/154, 235/183, 340/146.2, 340/347
[51] Int. Cl. ........................................................ G06f 15/50,
G06f 11/04
[50] Field of Search............................................. 235/150.2,
150.5, 150.51, 183, 153, 154; 340/347; 89/135;
244/3.14, 3.13, 77

[56] References Cited
UNITED STATES PATENTS

| 2,836,794 | 5/1958 | Davis et al. | 340/347 |
|---|---|---|---|
| 2,932,471 | 4/1960 | Exner et al. | 244/77 |
| 3,042,911 | 7/1962 | Paradise et al. | 340/347 |
| 3,134,957 | 5/1964 | Foote et al. | 340/347 X |
| 3,164,339 | 1/1965 | Schroader et al. | 244/3.13 |
| 3,273,141 | 9/1966 | Hackett | 340/347 |
| 3,341,697 | 9/1967 | Kaufman et al. | 235/150.5 X |
| 3,354,453 | 11/1967 | Hibbits et al. | 340/347 |
| 3,356,314 | 12/1967 | Campbell et al. | 244/3.13 |
| 3,465,134 | 9/1969 | James | 235/183 |

*Primary Examiner*—Malcolm A. Morrison
*Assistant Examiner*—Felix D. Gruber
*Attorneys*—R. S. Sciascia and J. A. Cooke ABSTRACT: A data conversion and control system comprising an input and an output section, which function to establish compatibility between an inherently analog missile fire control system or the like and a general purpose digital computer and thereby form a closed-loop, digital type fire control system. More specifically, means are provided at the input to the digital computer for converting all of the input data signals from the fire control system, regardless of their form, into a digital format acceptable by the computer and, moreover, such conversion operations are performed accurately, in reduced data conversion time. Also, means are provided at the input to the computer for making, where necessary, determinations of the algebraic sign of the input analog data signals and of the angle of input synchro data signals, for later use in the digital computer. At the output of the computer, means are provided to accept the digital outputs therefrom and convert them, where appropriate, into the various types of control signals normally associated with the missile fire control system. The present invention also provides for connecting the computer in a novel end-around test mode for the purpose of checking that both the input and output sections of the proposed data conversion and control system are operating properly. The proposed data conversion and control system of the present invention is particularly adapted for use with the fire control system for the Talos missile and provides a more accurate control of the doppler frequency guidance control signal communicated, by the fire control system, to the missile, in such a manner that there is a quicker acquisition of the target, by the missile.

ROGER K. HIGGINS
ANDREW T. SHEETS
INVENTORS

BY J. O. Tresansky
ATTORNEY

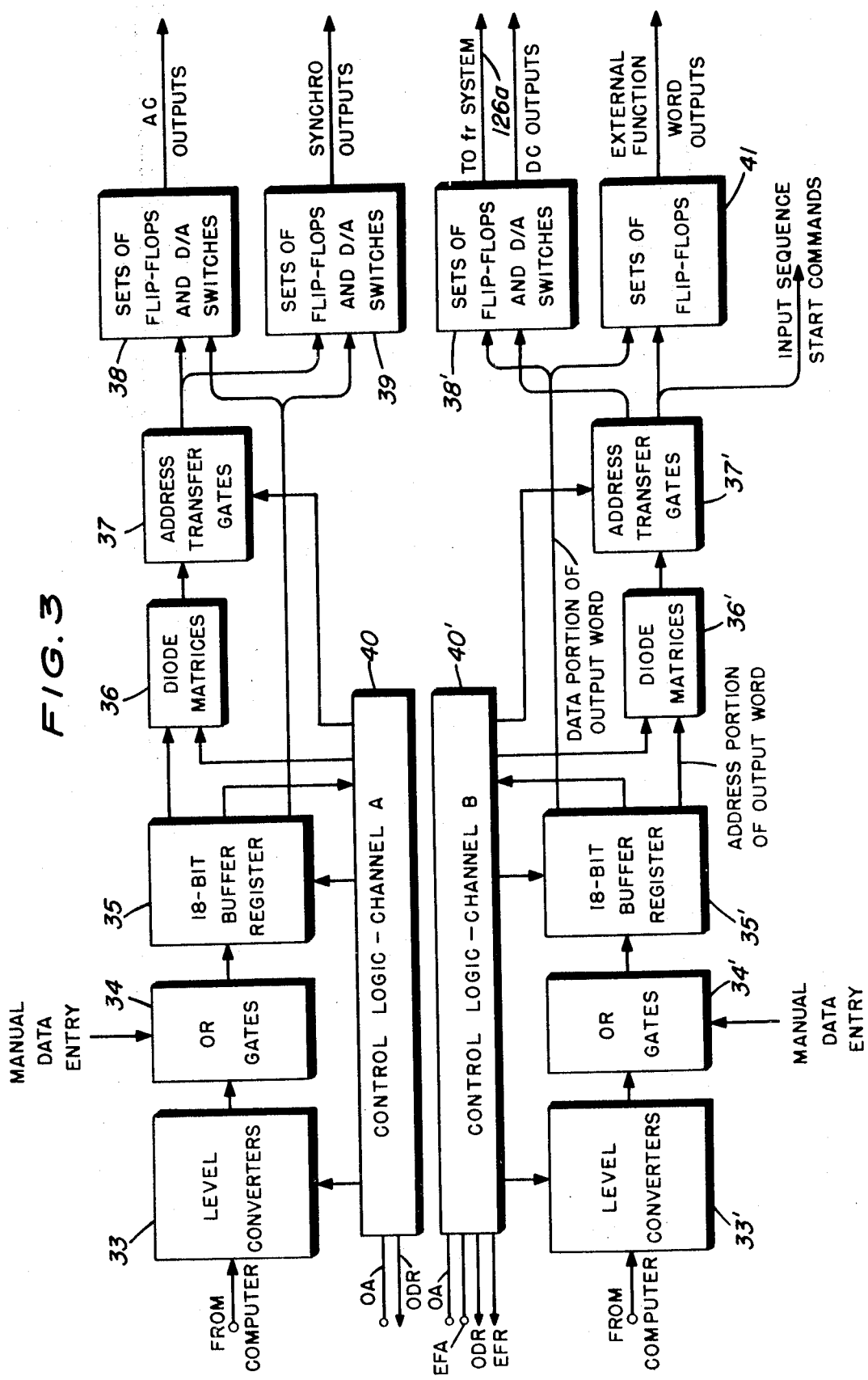

DATA CONVERSION AND CONTROL SYSTEM

BACKGROUND OF THE INVENTION

The present day fire control system employed, for example, upon navel ships for controlling guided missiles comprises inherently analog apparatus and supplies the basic intelligence and control functions for the effective engagement of targets by the missiles, including the solution for proper missile launcher and inflight missile guidance commands. As with any analog type system, the accuracy and/or reliability of the past fire control systems have often been relatively poor and continual maintenance and operating checks and therefore usually required. Moreover, when employed for controlling missiles of the Talos type, which is a beam rider during part of its flight and later switches over to doppler homing guidance, several seconds before the homing phase begins, the fire control system also controls the AN/SPQ-49B tracking radar to transmit a so-called doppler frequency signal to the missile for the purpose of enabling the missile to lock onto or acquire its designated target. However, up until now, this doppler frequency command signal has been generated by a servo-controlled oscillator which operates open-loop and therefore provides inadequate check on the reliability of the output doppler frequency signal.

In order to establish compatibility between such an inherently analog system, as the aforementioned missile fire control system, for example, and a digital computer so that the computer may properly control the functioning of the analog system, interface apparatus is required. This interface equipment should, moreover, be capable of performing the necessary analog to digital, digital to digital and digital to analog conversions accurately and at rapid data handling rates.

DESCRIPTION OF THE INVENTION

In view of the foregoing, it is proposed in accordance with the present invention to provide data conversion and control apparatus particularly adapted to form a digitally operating fire control system, for guided missiles for example, by establishing compatibility between a conventional analog type, fire control system and a general purpose digital computer, such as the UNIVAC 1218. The proposed data conversion and control system of the present invention includes circuitry at the input of the digital computer which functions to convert the input data (which can be an analog type representing synchro and AC information or a digital type representing relay and switch operations) from the fire control system into a digital format usable by the digital computer, and output circuitry which responds to the output data from the digital computer and converts it into forms (synchro, AC and DC) usable by the fire control system. Moreover, the output section receives so-called external function words from the computer and converts them to digital signals used, for example, for controlling the processing of data by the input section to the computer.

More specifically, the input section of the proposed data conversion circuitry of the present invention performs analog to digital conversion, when necessary, both accurately and with minimum required conversion time. As will be explained in more detail hereinafter, one manner in which this analog to digital conversion accuracy is attained is, for example, by utilizing integration of the input analog data during 120° of an AC reference control signal with the integration interval centered at either the 90° or 270° positions of the reference AC signal, so as to reduce third harmonic noise and eliminate so-called quadrature distortion from the input data applied to the digital computer. Moreover, it is proposed in accordance with the present invention that each analog input data word; i.e., the value of the analog signal associated with each of the various sources of synchro and AC data contained in the fire control system is subjected to integration and then analog to digital conversion on successive half-cycles of this AC reference control signal; i.e., while one input data word is being converted to a digital format, another input data word is being integrated. As a result, the total time needed to convert all of the input data into the usable digital format is greatly reduced.

Another manner in which the data conversion and control system of the present invention is able to provide accurate analog to digital conversion is by the provision of novel circuitry adapted to perform a simplified determination of the algebraic sign of each input data word. More specifically, this sign determination circuitry generates a digital code representative of the algebraic sign of each input data signal and this digital sign code is applied, along with the digital code representative of the magnitude of the input analog data signal, to the general purpose digital computer where the input data is operated upon to solve the launcher and missile guidance control problems previously programmed into the digital computer.

It is also proposed in accordance with the present invention to provide for making an operational test of the input and output sections, in a so-called end-around test mode during which the digital computer generates a predetermined test word which is applied, via the output section where the digital test word is converted to an equivalent analog signal, back to the input section where the analog test signal is reconverted to the digital format of the computer. This reconstructed test signal from the input section is then compared, by means within the computer, with the predetermined test signal originally transmitted to the computer's output section and any error between these two signals is printed out. In other words, this end-around test enables an operator to quickly check upon whether or not the input and output sections are operating properly.

Although many of the features of the present invention have obvious application in the general area of data processing, the proposed apparatus is particularly adapted as previously mentioned, for establishing compatibility between an inherently analog missile fire control system and a general purpose digital computer and thereby enable the computer to provide closed-loop control of the fire control system. For example, as will be described in more detail hereinafter, the proposed circuit apparatus of the present invention enables the digital computer to provide rapid, closed-loop control of the so called doppler frequency signal transmitted to the missile by the missile tracking radar and used by the missile in acquiring the target.

In view of the foregoing, one object of the present invention is to provide data conversion and control apparatus capable of establishing compatibility between a general purpose digital computer and an inherently analog missile fire control system.

Another object of the present invention is to provide data conversion and control apparatus capable of functioning as interface equipment between an inherently analog missile fire control system or the like and a digital computer, so as to enable the digital computer to exercise improved, closed-loop control over the inherently analog system.

Another object of the present invention is to provide data conversion and control apparatus capable of accurately converting analog input data into digital form with minimum third harmonic noise and quadrature distortion.

Another object of the present invention is to provide a data conversion and control system wherein analog input data is subjected to integration and then analog to digital conversion on successive half-cycles of an AC reference signal so as to reduce overall analog to digital data conversion time.

Another object of the present invention is to provide a data conversion and control system comprising a general purpose digital computer having an input and an output section for causing the digital computer to be compatible with an inherently analog utilization system under the control of said computer and capable of being connected in an end-around test mode wherein the output section is connected to receive a predetermined test signal from the computer and feed it back to the input section of the computer so that the computer may compare it with the test signal originally sent to the output section and thereby determine whether or not the input and output sections of the computer are operating properly.

Another object of the present invention is to provide a data conversion and control system capable of connecting a general purpose digital computer in a closed-loop servo system with the fire control system for a Talos missile, for example, so that the computer may accurately control the frequency of the so-called doppler frequency control signal transmitted to the missile, by the tracking radar, to enable the missile to more quickly acquire its intended target.

Other objects, purposes and characteristics features of the present invention will in part be pointed out as the description of the present invention progresses and in part be obvious from the accompanying drawings, wherein:

FIG. 3 is a simplified block diagram of the output section of the data conversion and control system of FIG. 1;

Figure 2:
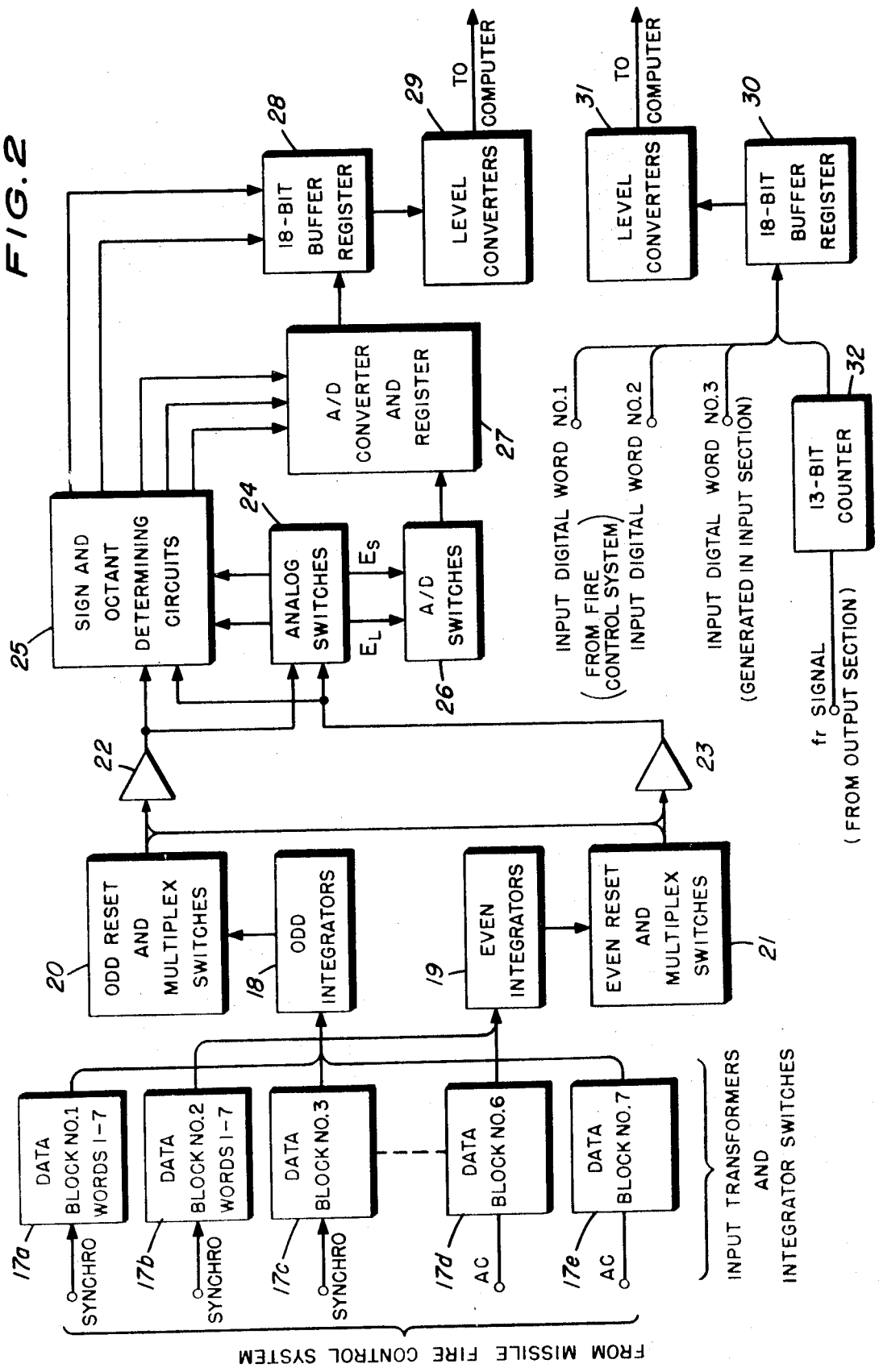
FIG. 2 is a simplified block diagram of the input section portion of the data conversion and control system shown in FIG. 1.
Figure 5A:
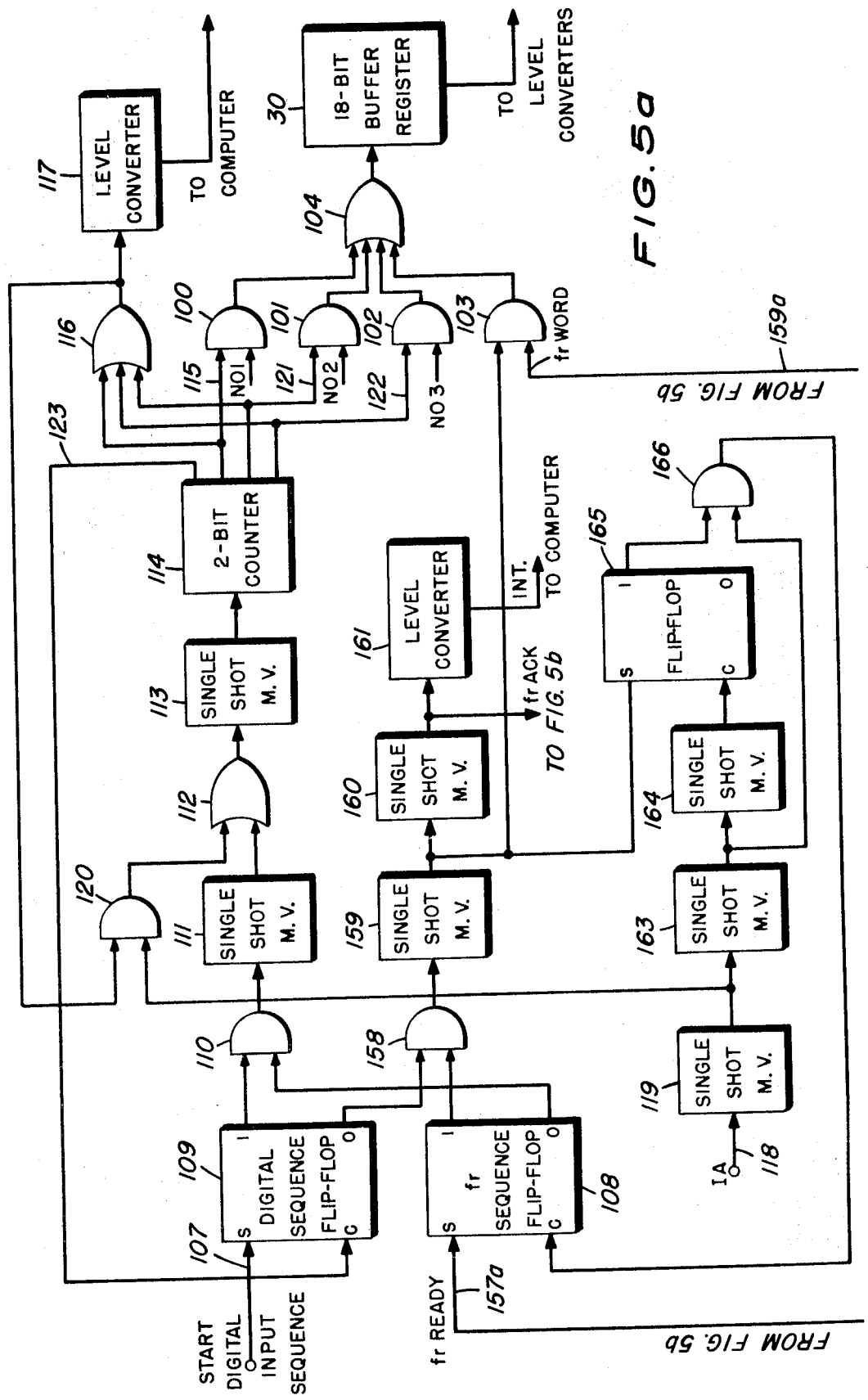
Figure 5B:
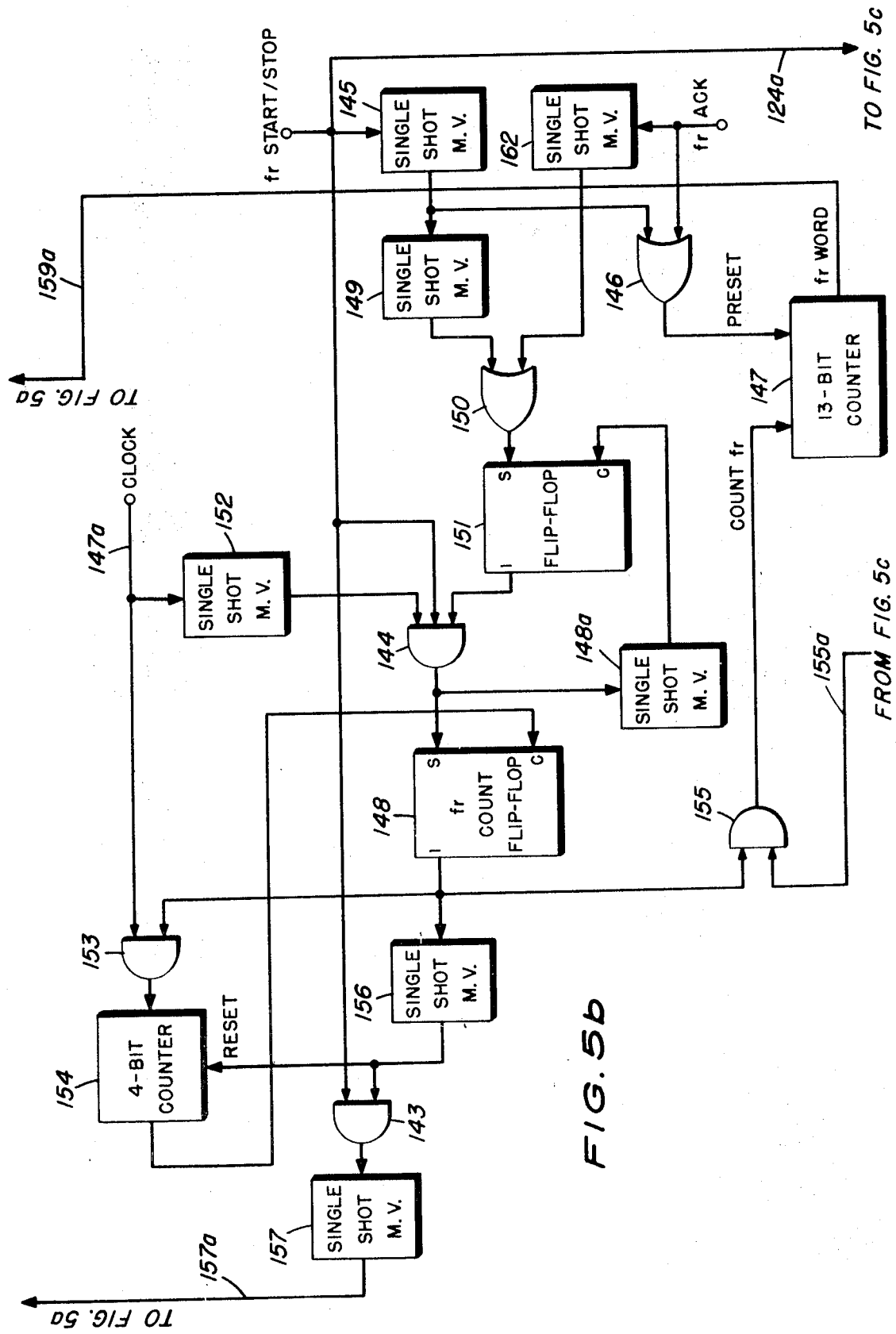
Figure 5C:
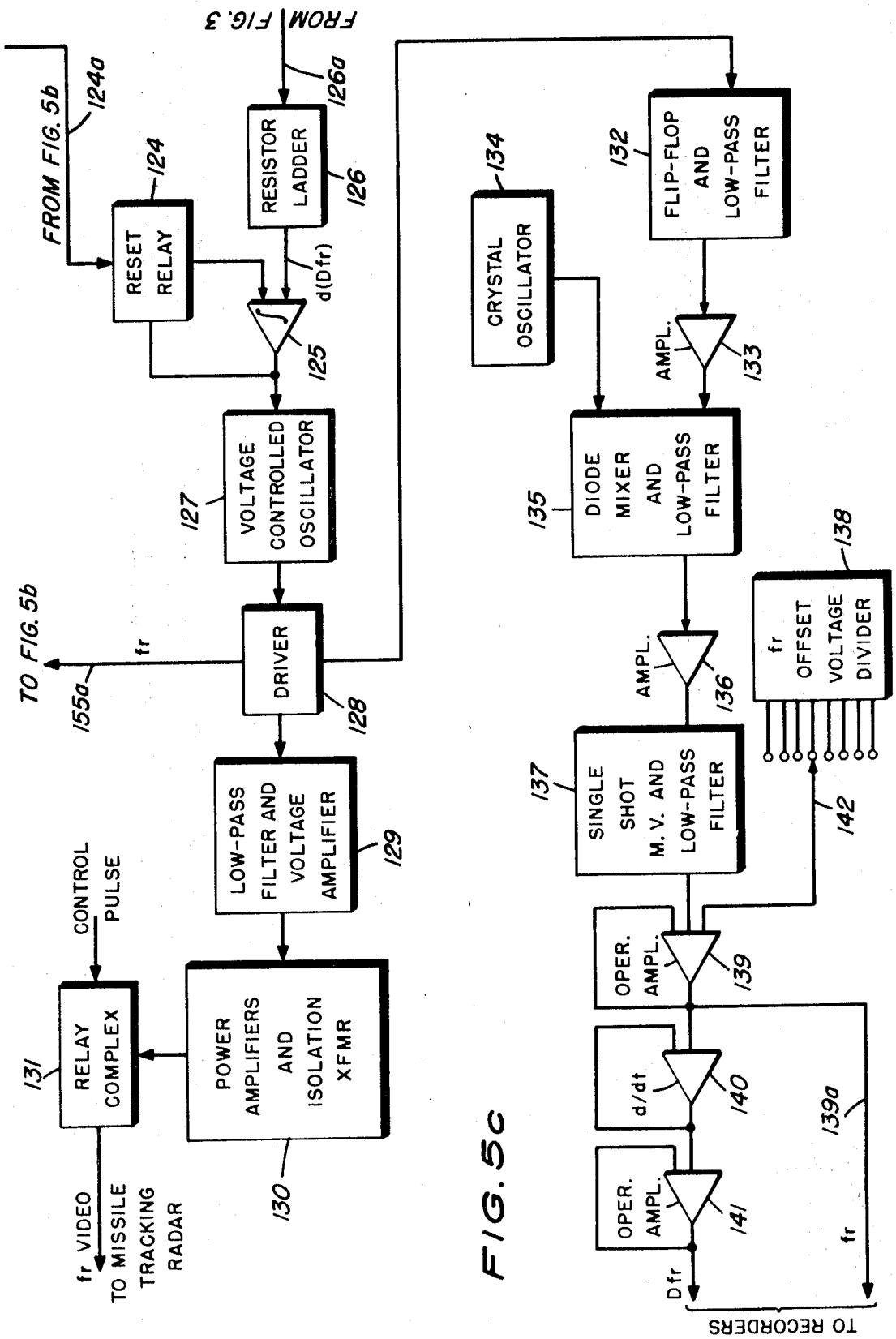
Figure 6:
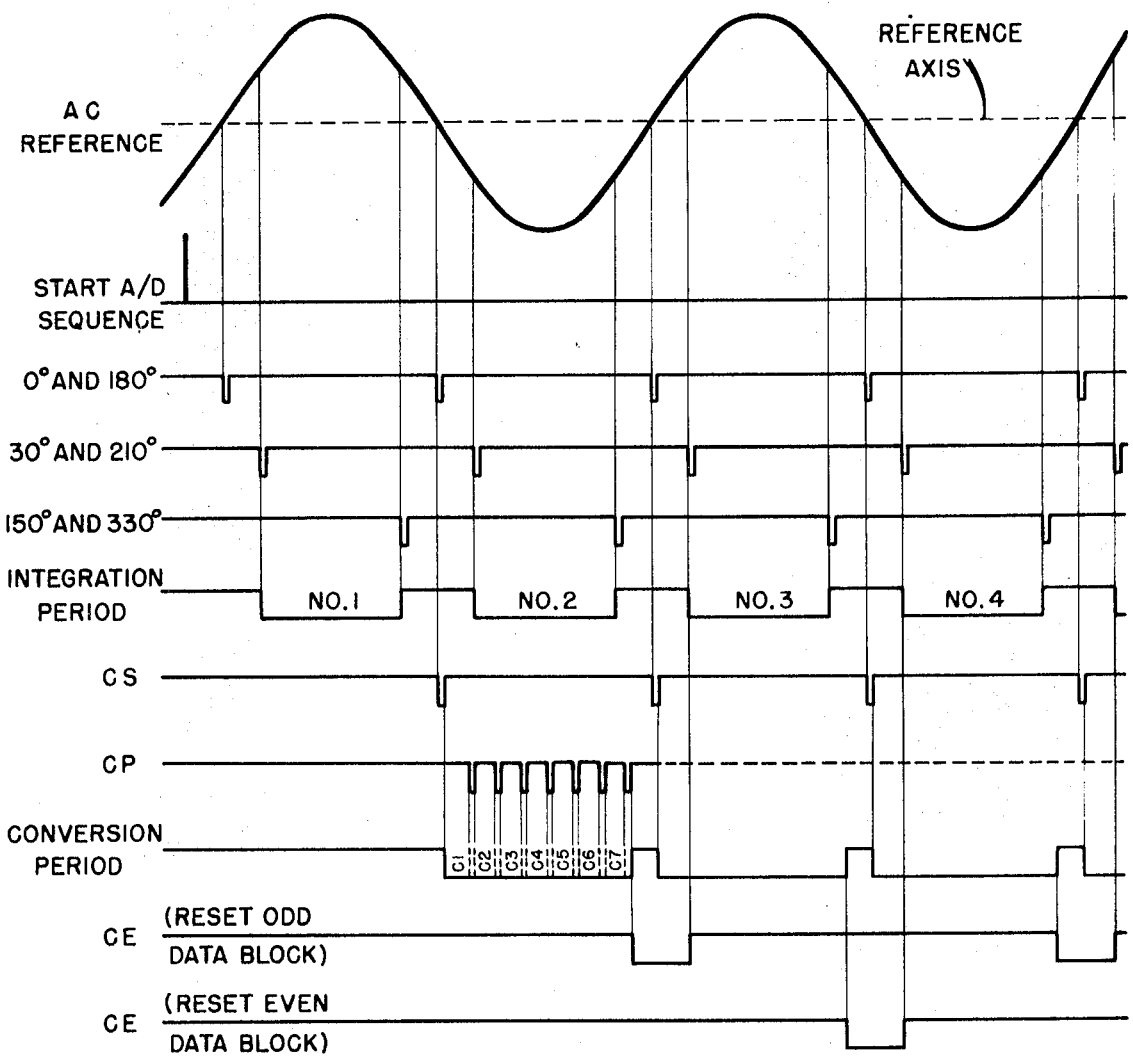
Figure 7:
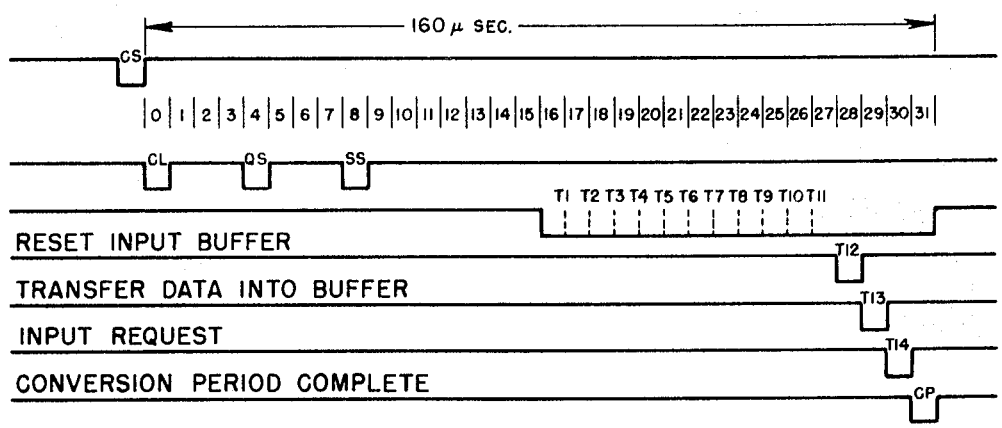
Figure 8:
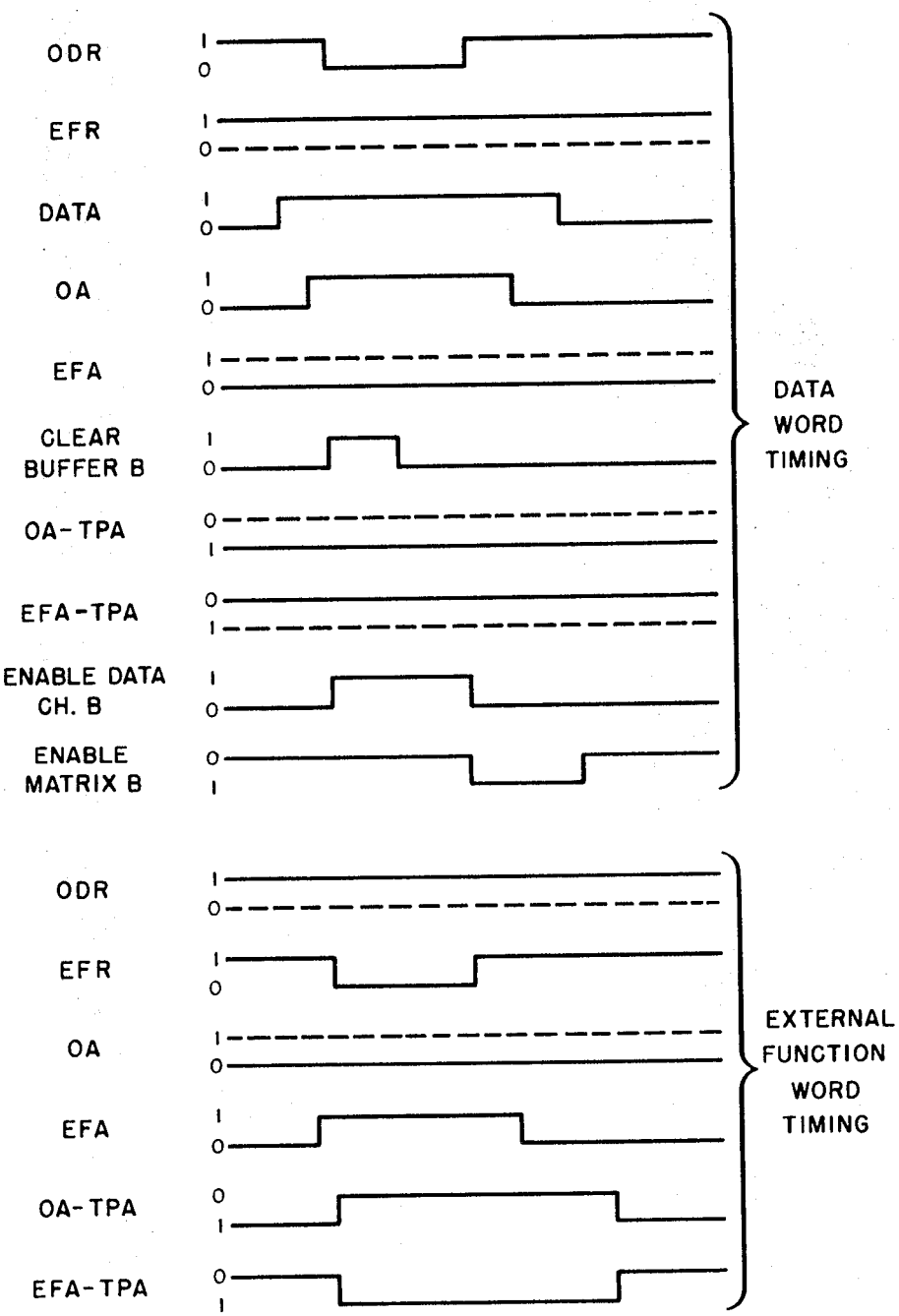
Figure 9:
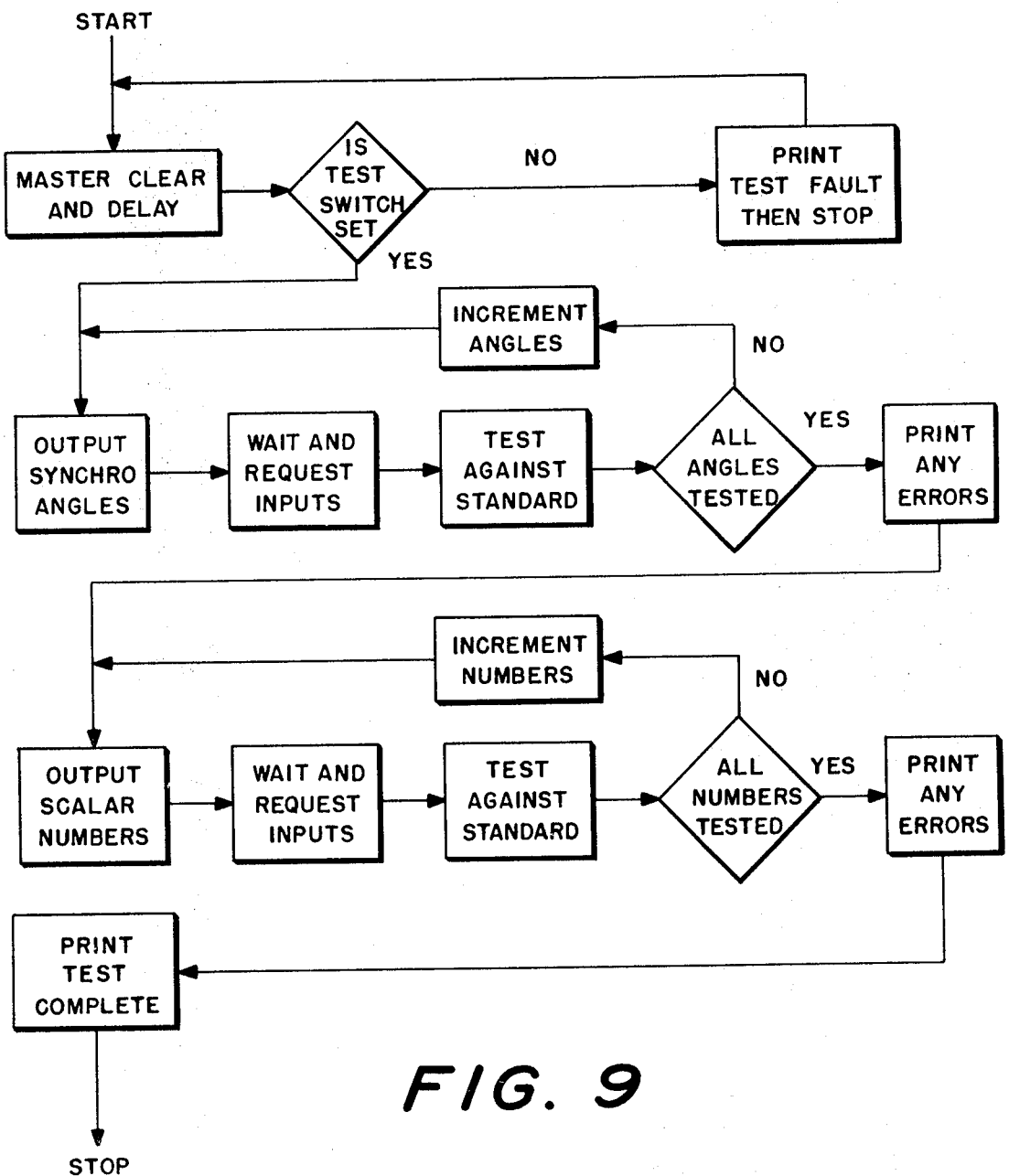

FIGS 4a through 4d, when placed side by side, form a more detailed block diagram of that portion of the input section shown in FIG. 2 which converts input analog and synchro data into computer digital format;

FIGS 5a through 5c, when placed one above the other, form a detailed block diagram of that portion of the proposed apparatus which functions to provide closed-loop control of the doppler frequency control signal transmitted to the missile by the tracking radar;

FIG. 6 is a diagrammatic illustration of the various timing control pulses utilized by the input section of FIGS. 4a through 4d when performing analog to digital conversion of analog input data;

FIG. 7 is a diagrammatic illustration of certain of the timing control pulses shown in FIG. 6, on an expanded time base, and also illustrating, in more detail, the timing intervals employed during a typical analog to digital conversion period;

FIG. 8 is a diagrammatic illustration of timing pulse waveforms employed to control the operation of the output section illustrated in FIG. 3; and FIG. 9 is a simplified flow diagram of the program-controlled end-around test operation performed in accordance with the present invention.

Figure 1:
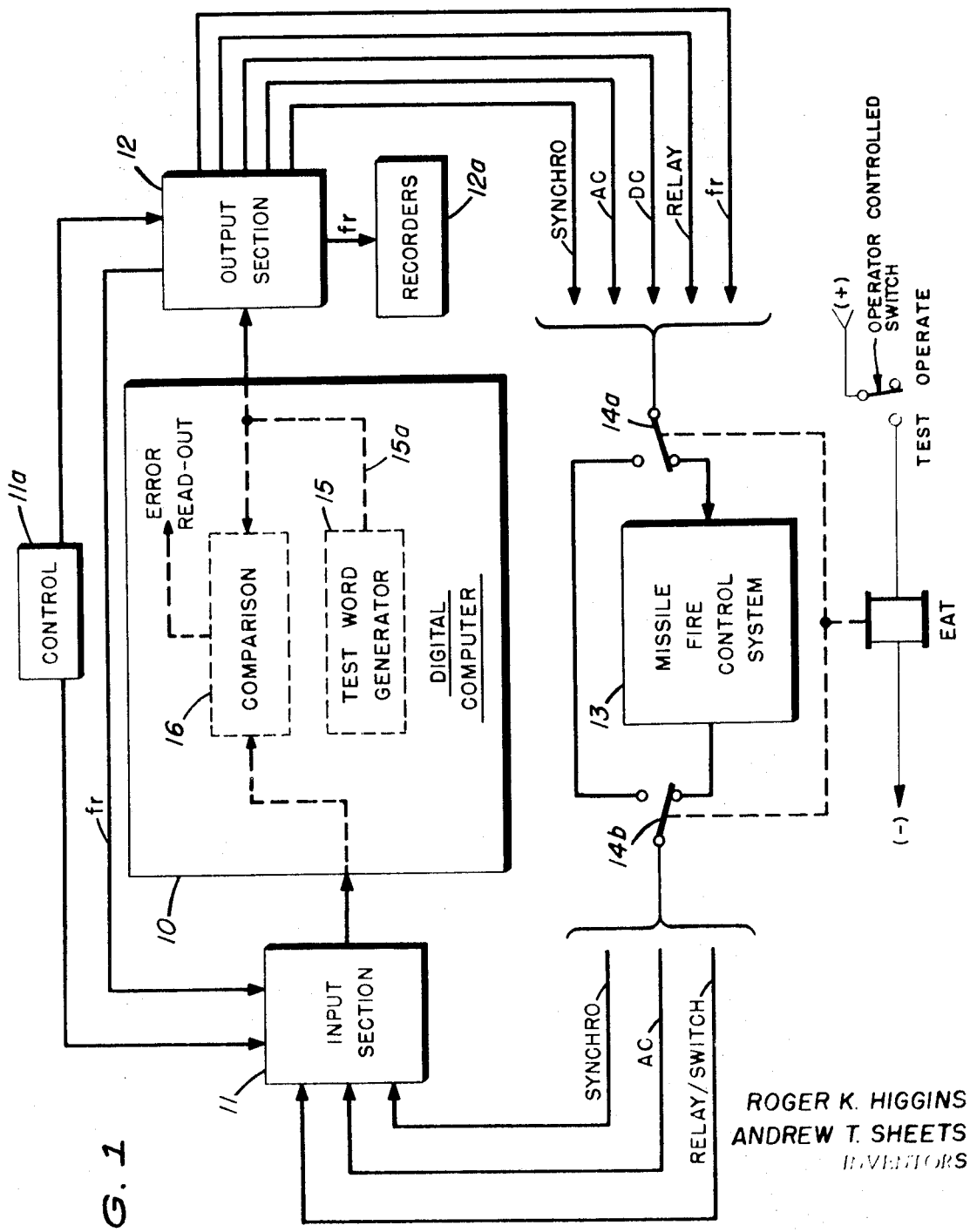
FIG. 1 is a simplified block diagram illustrating the data conversion and control system provided by the present invention to enable a digital computer to control the operation of an inherently analog missile fire control system.

Referring now to FIG. 1 of the drawings, the data conversion and control system of the present invention is particularly adapted for use with a general purpose digital computer 10, and comprises an input section 11 and an output section 12 which, generally speaking, establish compatibility between the digital computer 10 and an inherently analog missile fire control system 13. In other words, the input section 10 and output section 11 function to connect the computer 10 to the fire control system 13, in a closed-loop fashion, so as to enable the computer 10 to control both launching and guidance of a guided missile towards target; i.e., a closed-loop, digital-type missile fire control system evolves. As mentioned previously, one form of general purpose digital computer suitable for use in the system of the present invention is the UNIVAC 1218.

The missile fire control system shown at 13 might, for example, be of the type used for controlling a Talos missile. Within the fire control system 13 are generated AC and synchro data, in the form of analog signals, and relay switch data which represent the operation of relays and/or switches and which may be thought of as being digital in nature. All of these outputs from the missile fire control system 13 are applied to the input section 11 where they are converted into a digital format acceptable to the digital computer 10, as will be described in more detail hereinafter.

The digital computer 10 responds to and operates on this converted input data, in accordance with well-known missile launch and in-flight control equations, and produces digital output data, in computer format, which is applied to the output section 12 where some of it is converted to analog signals (synchro, AC and DC) which are transmitted to the missile fire control system 13 and the remainder of it is converted into digital control signals used for controlling relays within the fire control system 13 and for controlling the processing of data by the input section 11, as is represented by control 11a. In other words, the output section 12 at times converts the digital output from computer 10 into synchro, AC and DC control signals to be fed to the fire control system 13; at times converts the computer output into signals for controlling relays contained in the fire control system 13; and at other times handles computer outputs which control the operation of the input section 11, as is described in detail hereinafter. As shown in FIG. 1, control block 11a is intended to diagrammatically represent the various start sequence signals and other timing control signals, to be described in detail hereinafter, which control operation of the input and output sections 11 and 12. Moreover, suitable recorders 12a may also be connected to the output section 12 for the purpose of providing a permanent record of the output data generated by the computer 10, if desired.

As mentioned previously, the data conversion and control system of the present invention is capable of being connected in an end-around test mode wherein the missile fire control system 13 is bypassed or disconnected and the output section 12 is connected directly to the input section 11. More specifically and with reference to FIG. 1, a suitable switch means such as relay EAT has contacts 14a and 14b which function to control the connection of the missile fire control system 13 to the input section 11 and output section 12.

During end-around testing of the input and output sections 11 and 12, the digital computer 10 is programmed to generate a predetermined test word, as is represented, for example, by the generator designated 15 in FIG. 1, and applies it via program branch 15a to the output section 12 where the digital test word is converted into an equivalent analog signal. This analog of the test word is then applied, through front contacts 14a and 14b of relay EAT, to the input section 11 where it is converted back into the digital format of the computer 10 and subsequently compared, as represented at 16, with the original test word. This comparison is enabled by the test program and results in an error readout in the event that the predetermined test word does not agree with the digital test word received from the input section 11. In this manner, the operator is able to quickly perform a simple check on whether or not the output section 12 and input section 11 are functioning properly.

Obviously, the relay EAT has many more contacts than those shown in FIG. 1; i.e., depending upon the requirements of practice, there would be sufficient switching capabilities to handle the various types of signals to be processed by the input and output sections during both the normal operating mode and end-around testing. When the operator wishes to place the proposed data conversion and control system in the end-around test mode, he merely causes energization of the relay EAT, by a suitable circuit such as that shown in FIG. 1, and thereby connects the output section 12 directly to the input section 11; whereas, when the operator wishes to return the system to its normal operating mode, he merely deenergizes the relay EAT.

A simplified flow diagram if the above-mentioned test program employed during the end-around test mode is illustrated in FIG. 9 of the drawings. More specifically, testing of the synchro channels (to be described in detail hereinafter) can be accomplished, for example, by utilizing a well-known lookup table within the computer 10 which generates, as represented at 15 in FIG. 1, any desired quantity of test numbers, depending upon how complete a test is desired, representing the sine and cosine of preselected values of the synchro shaft angle $\theta$ and which are transmitted to the output section 12 and subsequently to the input section 11, via the energized relay EAT. The synchro input conversion apparatus of input section 11 operates on this test data, in a manner to be described in detail hereinafter, and provides, for each value of the test angle, a number comprising an octant code and the tangent or cotangent. The resulting numbers produced by the input section 11 are subsequently applied to the computer 10 for comparison, as represented at 16 in FIG. 1, against the original test number or word. As shown in FIG. 9, end-around testing of the remaining channels or portions of the input and output sections 11 and 12 (e.g., AC signals) is performed in substantially the same program sequence, by: generating test scaler number or words in the computer 10; applying them successively to the output and input sections 12 and 11; and subsequently comparing the resulting inputs from the input section 11 against the originally generated standard or test numbers or words. A simplified block diagram showing the input section 11 in somewhat more detail is illustrated in FIG. 2 of the drawings. As will be described in more detail hereinafter, this input section 11 is made up of an analog subsection which receives the synchro and AC analog data inputs form the missile fire control system 13 and a digital subsection which receives the relay/switch digital input words and the doppler word (designated as $fr$) generated at the output section 12 in FIG. 1.

More specifically, the synchro and AC analog data from the missile fire control system 13 are arranged in seven data blocks (see FIG. 2) each of which consists of seven data words, with each data word comprising a 400 cycle per second voltage from a single source. Therefore, the analog subsection of the computer input section 11 is capable of handling inputs from 49 sources of synchro and AC data. These AC and synchro input data words are initially applied, in FIG. 2, to blocks 17a through 17e which include input transformers and integrator switches to be described in more detail hereinafter.

At the output of the transformers and integrator switches 17a through 17e, are connected ODD integrators 18 serving the No. 1, 3, 5 and 7 data blocks and EVEN integrators 19 serving the No. 2, 4 and 6 or even data blocks. The integrators 18 and 19 are then controlled to produce DC voltages proportional to the amplitude of each synchro and AC input data voltage which are subsequently applied through ODD and EVEN reset and multiplex switches 20 and 21 respectively, to buffer amplifiers 22 and 23. As will be described in more detail hereinafter, the multiplex switches contained in blocks 20 and 21 are used to sequentially sample the output voltages of integrators 18 and 19 at the correct times and to apply these voltages to the buffer amplifier set 22–23; whereas, the ODD and EVEN reset switches are employed to reset or clear the associated integrators 18 and 19 at the proper time.

At the output of the buffer amplifiers 22 and 23 appear two voltages which are analogs of either the sine or cosine of the input synchro shaft angle $\theta$ or the amplitudes of the AC input data and reference voltages respectively, depending upon whether the particular data word being sample is a synchro input or an AC data input. These two output voltages are applied, on one hand, to analog switches 24 which develop DC output voltages representative of the absolute values of the sine and cosine of the input synchro shaft angle $\theta$ and the input AC data signal and AC reference voltage. These voltages are applied, along with the outputs from buffer amplifiers 22 and 23, to sign and octant determining circuits 25 whose purpose is to determine the algebraic sign of the AC input data and the octant of the input synchro shaft angle $\theta$.

The analog switches 24 are also controlled, as will be pointed out hereinafter, to cause whichever of its input voltages (sin $\theta$ or cos $\theta$, for example) has a larger absolute value to appear at the output designated $E_L$ and the input voltage having the smaller absolute value to appear at the $E_S$ output. Analog/digital switches 26 receive these two DC outputs from analog switches 24 and, in conjunction with A/D converter and register 27, transforms them into an appropriate digital word, with a binary value equal to $E_S/E_L$, which is registered in A/D converter register 27, along with a three-bit digital code from circuits 25, when appropriate, indicating the octant within which the synchro shaft angle $\theta$ is located. By using the ratio of the $E_S$ and $E_L$ voltages, the analog to digital conversion process is made insensitive to variations in system voltage amplitude. Subsequently, the digital code content of the converter and register 27, together with a sign code, is applied, via 18-bit buffer register 28 and suitable level converters 29, as input to the digital computer.

On the other hand, digital word inputs from the missile fire control system are applied directly to an 18-bit buffer register 30 (see FIG. 2) where each digital word is converted into the proper format for subsequent application, through suitable level converters 31, to the digital computer. Also applied as input to the 18-bit buffer register 30 is a third or No. 3 digital word which is generated in the input section 11 (see FIG. 1), as will be described in more detail hereinafter, and the doppler frequency signal (designated $fr$) which is generated in the output section 12 of FIG. 1 and is applied through a 13-bit counter 32.

Referring now to FIG. 3, the output section 12 includes two separate channels for the output data from the computer 10. More specifically, a first channel A is assigned to handling the AC data and synchro outputs from the computer 10; whereas, a second channel B handles the DC data outputs, the external function word outputs and the doppler frequency control signal ($fr$) produced by the computer 10. In channel A, the AC data and synchro outputs from the computer are each applied as an 18-bit digital code, through level converters 33 and OR gates 34, to an 18-bit buffer register 35. Subsequently, the 18-bit digital code from the buffer register 35 is applied, via diode matrices 36 and address transfer gates 37, to either of two digital to analog conversion units 38 and 39, dependent upon whether the particular code in the buffer register 35 represents either an AC data or a synchro output. More specifically, the 18-bit code within the buffer register 35 includes a four-bit portion which is indicative of the type of data which the code represents and which controls the diode matrices 36 and address transfer gates 37 so as to cause that particular code to be transferred to the proper digital to analog conversion unit 38 or 39. The transferring of an 18-bit code from the digital computer to the digital to analog conversion units 38 and 39 is under the control of logic unit 40, as will be explained in greater detail hereinafter.

Is should also be noted in FIG. 3 that the makeup of channel B is substantially identical to channel A and therefore corresponding parts of channel B have been designated with the same reference numerals raised to their primes. However, one difference which does appear between the respective channels A and B is that in channel B, the digital to analog conversion unit 39 of channel A is replaced by sets of flip-flops 41 which produce external function word outputs from the digital 18-bit code produced at the output of the computer. These external function words produced at the output of flip-flop sets 41 are used to produce control levels for relays located throughout the missile fire control system. It should also be noted in FIG. 3, that channel B produces the input sequence start command signals which initiate the operation of the input section, as will now be described, to receive and process the input data from the missile fire control system. In the drawings, the analog subscription of the input section is illustrated in FIGS. 4a through 4d; whereas, the digital subsection of the input section is illustrated in FIGS. 5a through 5c.

The illustrated output section of FIG. 3 also includes provision for manual entry of data at OR gates 34 and 34' of channels A and B respectively. This manual data entry is another test feature of the proposed system and is particularly useful in troubleshooting the equipment and in sending selected signals to the missile fire control system.

Before beginning a more detailed description of the proposed data conversion and control system of the present invention, it should be understood at this time that, in order to simplify the drawings, all of the interconnections between the computer 10 and the input section 11 and between the computer 10 and the output section 12 have not been shown in detail. Such a showing is considered unnecessary inasmuch as the details regarding interconnector pin assignments (for both data lines and control signal lines) for connecting a Univac 1218 computer to input and output converter apparatus are listed at pages 26 and 27 of the above-noted Univac Manual entitled On Input/Output Design Characteristics for Univac Defense Computers, published by the Univac Division of Sperry Rand Corp., St. Paul, Minn.

INPUT SAMPLING AND INTEGRATION

As mentioned previously, synchro and AC data from the fire control system are arranged, in the input section, in seven data blocks, each containing seven data words. A data word, in turn, is a 400 cycle per second voltage from a single source and therefore the analog subsection of the input section to the computer is capable of handling inputs from 49 different sources of synchro and AC data.

Figure 4A:
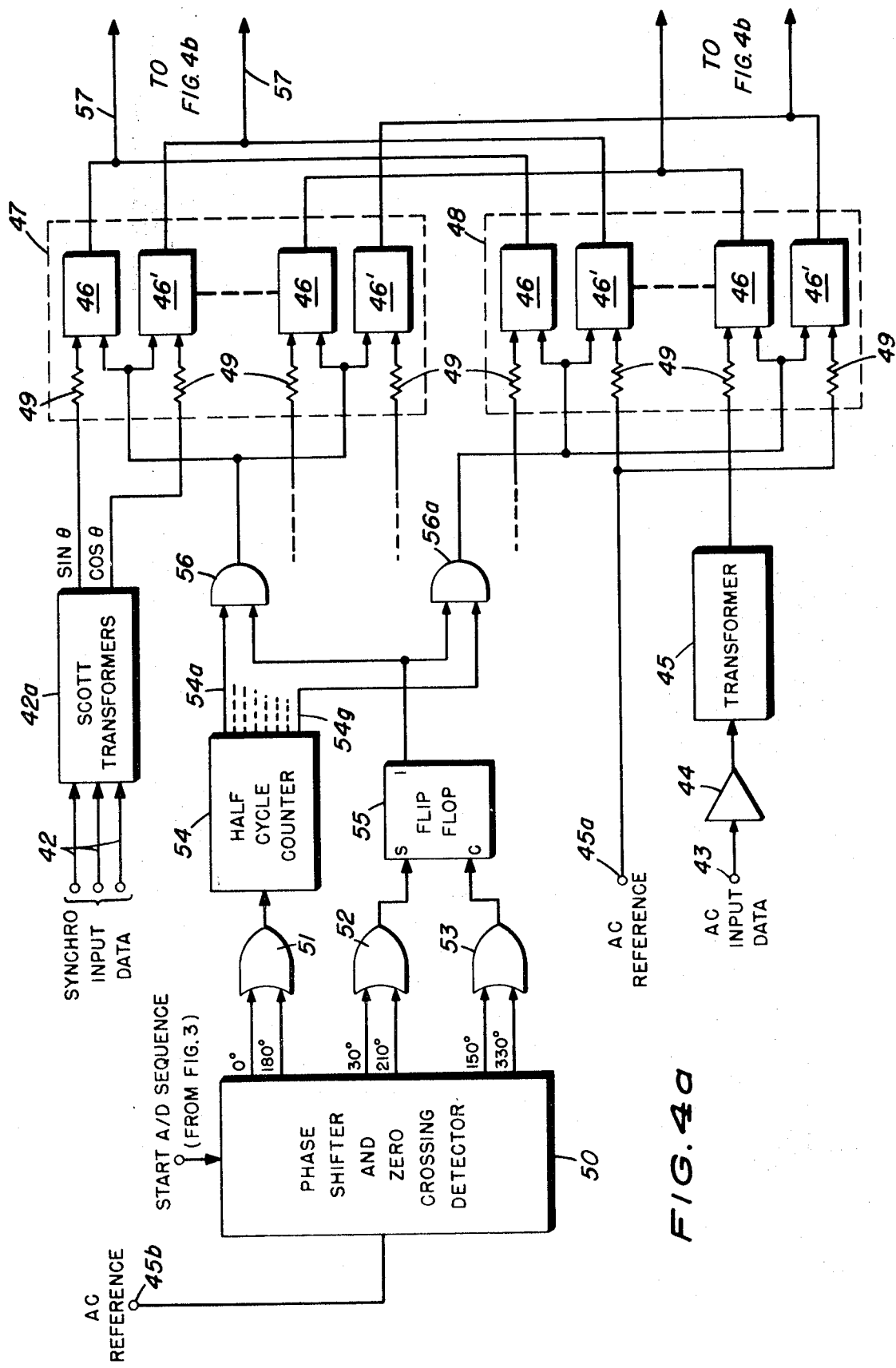

More specifically, a typical synchro input consists of three AC voltages applied, for example, to synchro input lines such as those designated at 42 in FIG. 4a. The amplitude of these three voltages are a function of a particular synchro shaft angle $\theta$ in the missile fire control system (see FIG. 1); with the maximum amplitude of any voltage on the lines 42 being a nominal 90 volts. These input synchro voltages are applied to a pair of Scott-connected transformers 42a which produce two output voltages; one proportional to sin $\theta$ and one proportional to cos $\theta$. On the other hand, a typical AC input data signal such as that applied, for example, at input 43 in FIG. 4a, is a single phase AC voltage whose amplitude is controlled by a component in the missile fire control system. This typical input AC data voltage is first applied to an operational amplifier 44, to minimize loading of the data source in the fire control system, and then to a transformer 45. Associated with every AC data input is a reference AC voltage of constant amplitude which is applied, for example, at input 45a and which is also used to initially excite the data sources on a function to function basis. It will thus be noted that for every analog input, whether synchro or AC data, there are two voltages available for sampling; the sin $\theta$ voltage and the cos $\theta$ for a synchro input and the data voltage and the reference voltage for an AC data input.

These analog input voltage pairs, for both synchro and AC data, are applied as inputs to a plurality of integrator switch pairs 46 and 46' which are arranged in groups corresponding to the manner in which the input data is applied. More specifically, with 49 possible analog input voltages, there are 49 pairs of integrator switches 46-46' (one pair for each analog input) divided into seven groups corresponding to the seven input data blocks and each group containing seven data pairs of integrator switches corresponding to the seven data words in the associated data block. In FIG. 4a, in order to simplify the drawings, only two such data block groups 47 and 48 are illustrated and might, for example, handle the first and seventh input data blocks respectively. As noted in FIG. 4a, each input analog voltage is applied to an integrator switch 46 or 46' through a resistor 49 which forms part of an RC integrator circuit to be described hereinafter.

Sampling of the analog input voltages is accomplished by closing the integrator switch pairs 46-46' for the different data block groups 47, 48 etc. in an ordered sequence, under the control of timing pulses derived from a control circuit network comprising the phase shifter and zero crossing detector circuit 50, OR gates 51, 52 and 53, half-cycle counter 54, flip-flop 55, and AND gates 56 and 56a. Although only two AND gates 56 and 56a are shown in FIG. 4a, a total of seven would be required, one for each of the data block groups 47, 48 etc.

The digital computer requests analog input data by transmitting an external function word to the output section of FIG. 3. The output section then transmits a START A/D SEQUENCE signal (see FIG. 6) to initiate operation of the phase shifter and zero crossing detector network which can be of any conventional design such as is shown and described in detail at pages 6-8 through 6-12 of Notes on Analog-Digital Conversion Techniques, by A. K. Susskind; copyright 1957 by M. I. T. Press. Thereafter, the phase shifter and zero crossing detector network 50 operates, in a manner well-known to those skilled in the art, to produce timing pulse outputs (see FIG. 6) demarcating respectively, the 0°, 30°, 150°, 180°, 210°, and 330° points during each period or cycle of the input AC reference voltage applied at terminal 45b. The 0° and 180° pulses are subsequently applied as inputs to OR gate 51 and thereby pulse the half-cycle counter 54 at the beginning of each half-cycle of the input AC reference voltage. The half-cycle counter 54 which may be of any conventional design such as is shown and described in detail at pages 4-21 through 4-23 of the above mentioned Notes on Analog-digital Conversion Techniques, by A. K. Susskind, responds to these 0° and 180° pulses and sequentially energizes or pulses its seven output lines 54a-54g during successive half-cycles of the input AC reference voltage. The 30° and 210+ timing pulse outputs from the circuitry 50 are applied, via OR gate 52 to the set input of flip-flop circuit 55; whereas, the 150° and 330° timing pulse outputs from circuitry 50 are applied, via OR gate 53 to the reset input of flip-flop 55. Consequently, the flip-flop circuit 55 produces an output pulse level during the time interval between the 30° and 150° points of the AC reference signal and between 210° and 330° points of AC reference voltage; i.e., the output of the flip-flop 55 represents during each reference cycle.

The output pulse levels from the flip-flop 55 are applied simultaneously as one input to all seven of the AND gates 56, 56a etc.; whereas, these AND gates receive their second input from the half-cycle counter 54. As a result, the And gates 56 and 56a etc. sequentially produce an integration period control pulse (see FIG. 6) which closes each of the integrator switches 46-46' in the associated switching group and causes all of the data words in the associated data block to be gated simultaneously through the integrator switches to passive integrating circuitry. As mentioned previously, by integrating only during 120° of the reference phase, centered on the 90° or 270° points, both third harmonic and quadrature distortion are minimized.

More specifically, the elimination of third harmonic noise results from the fact that integration occurs over 120° of the reference voltage signal, and such integration period is equal to the period of a full cycle of the third harmonic of the reference signal; i.e., integration over a full cycle of the third harmonic causes the third harmonic to produce substantially zero integrator output. As noted above, this 120° integration period is demarcated, for example, by the 30° and 150° outputs from circuitry 50 which are applied, via OR gates 52 and 53 respectively to flip-flop 55 and control it to produce a gating pulse (which exists for the 120° period) for one of the AND gates 56, 56a, etc. which, in turn, closes the associated integrator switches 46-46'.

During the integration period designated as No. 1 in FIG. 6, all of the integrator switches 46-46' contained in the switch group 47 of FIG. 4a are closed (to integrate the first data block) and the two voltages (data and reference or sin $\theta$ and cos $\theta$) are available for each of the seven data words are applied, through the resistors 49 and over wires 57 to a pair of integrating capacitors 58a and 58b (see FIG. 4b) which, together with the associated resistors 49, form passive integrating circuits. The time constant of these integrator circuits is selected to permit a DC voltage to be built-up, during the integration period, proportional to the amplitude of the applied AC data, AC reference, sin $\theta$ or cos $\theta$ voltage. In practice, two groups or sets of integrators are used; one set for integrating odd numbered data blocks and one set for integrating even numbered data blocks. However, in order to simplify the drawings, only the odd integrators (enclosed by dashed line 59) have been shown in FIG. 4b. Each set of integrators, such as that designated at 59, consists of seven pairs of integrator capacitors 58a and 58 b; i.e., one pair of integrating capacitors for each of the seven data words in a data block. It should be noted in FIGS. 4a and 4b that integrator switch group 48 is also associated with an odd numbered data block.

MULTIPLEXING

Figure 4B:
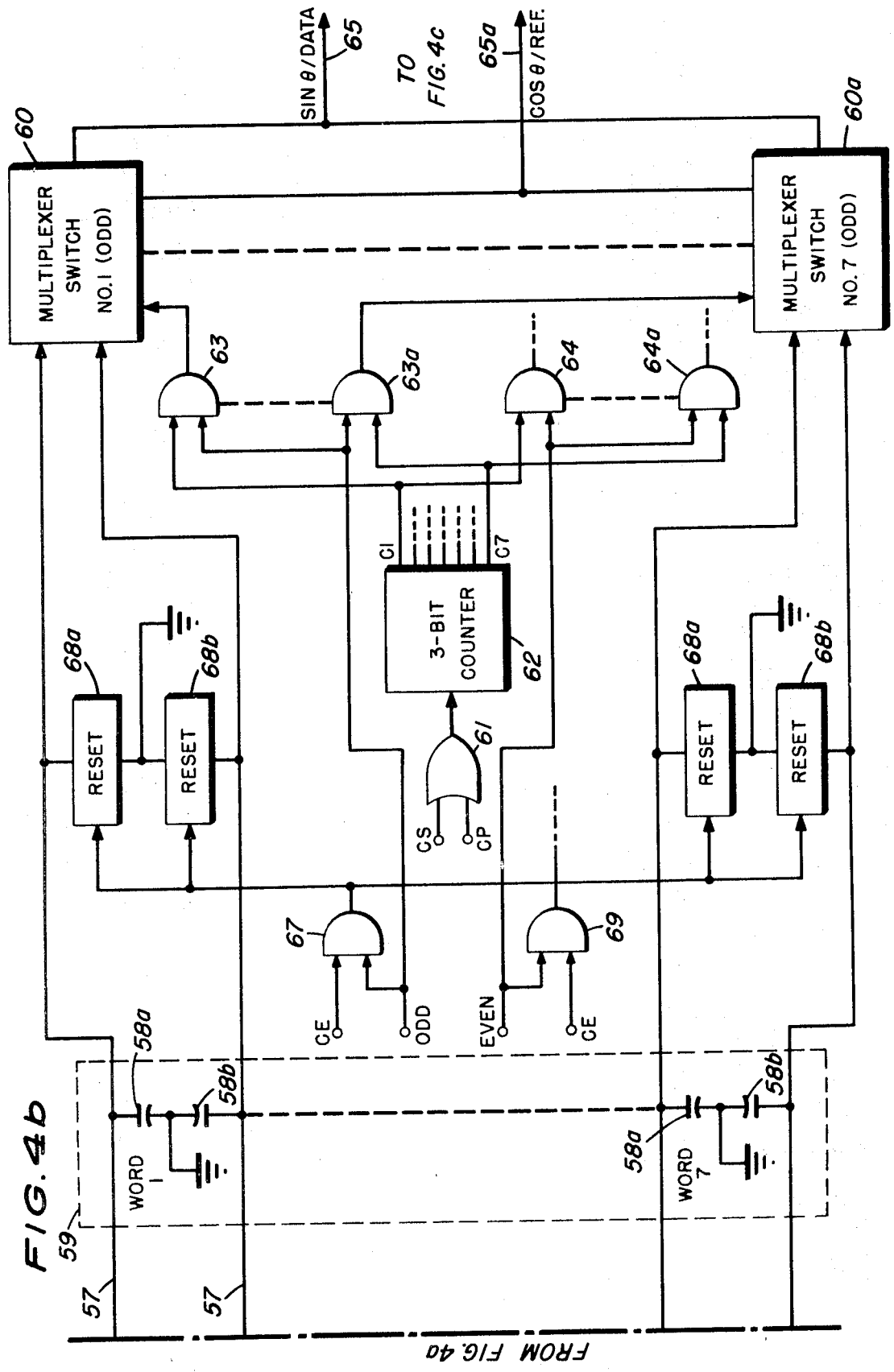
Figure 4C:
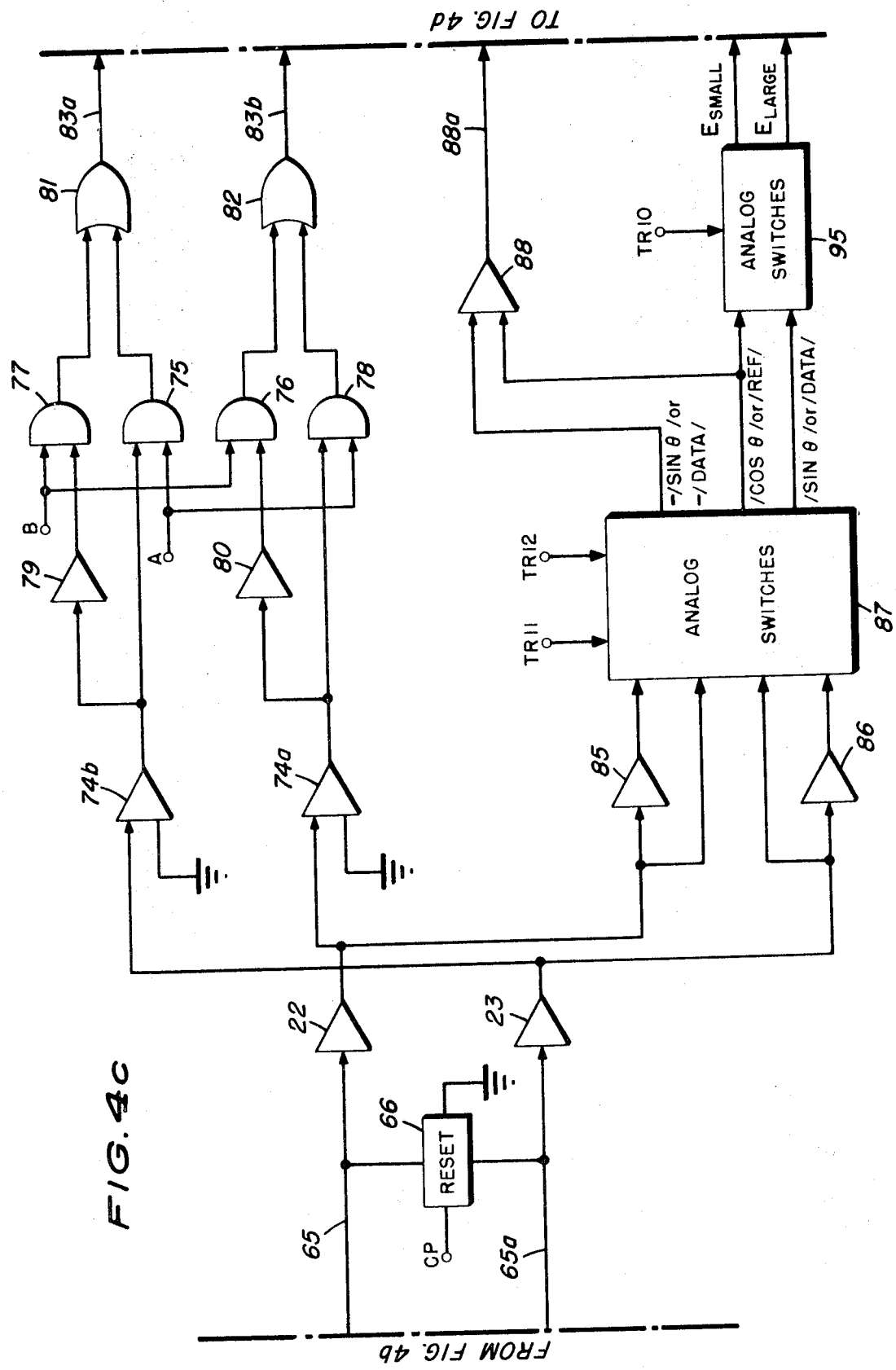

The outputs of the odd and even integrator sets, of which only the odd integrator set 59 is shown in the drawing at FIG. 4b, are applied to two groups of multiplexer switches which sequentially connect the integrating capacitor pairs (data words) to a single set of buffer amplifiers designated in FIGS. 2 and 4c at 22 and 23. More specifically, a group of seven multiplexer switches is associated with odd integrator set 59 (see FIG. 4b) and a similar group of seven multiplexer switches is associated with the even integrator set (not shown). In order to simplify the drawings, only two of the multiplexer switches contained in the group associated with the odd integrator set 59 are shown in FIG. 4b and have been designated by the reference numerals 60 and 60a. As noted in FIG. 4b the multiplexer switches 60 and 60a are associated with the first and seventh data words respectively of the odd data blocks. The actual multiplexing of the integrated analog input signals from the capacitor pairs 58a–58b in FIG. 4b to the buffer amplifiers 22 and 23 in FIG. 4c is controlled by certain timing pulses designated, in FIG. 4b, as the ODD, CS, CP and EVEN pulses.

More particularly and with reference to FIG. 6, with the exception of the first zero crossing after receipt of the START A/D SEQUENCE command, every zero crossing of the reference AC voltage causes generation of a CS or conversion start pulse by means of suitable conventional pulse generating circuitry (not shown) but which can be considered as part of the control unit 11a of FIG. 1. The conversion start CS pulse is inhibited during the first half-cycle of the reference voltage because there are no integrated data to be converted until the second half-cycle. These CS pulses are applied, along with the conversion complete CP pulses which are also generated by conventional pulse generating circuitry (not shown), to an OR gate 61, in FIG. 4b, and control the operation of a three-bit counter 62 which counts off or demarcates seven distinct conversion periods C1–C7, as shown in FIG. 6.

More specifically, the three-bit counter 62 has seven output lines C1–C7 which are connected to selectively actuate the multiplexer switches 60, 60a etc., for causing the integrating capacitor pairs 58a and 58b of FIG. 4b, and therefore the seven data words in a data block to be connected to the buffer amplifiers 22 and 23, of FIG. 4c, in sequence. The CS pulse thus sets the three-bit counter 62 to a count of one and thereafter, the CP pulses advance the count of counter 62 every one hundred and sixty (160) microseconds, for example. Although the counter 62 is advanced every 160 microseconds, its decoded outputs C1 through C7 are one hundred and fifty-five (155) microseconds in duration and are separated by five (5) microseconds; the width of a CP pulse. The C1–C7 outputs of counter 62 are selectively connected to two groups of AND gates 63–63a and 64–64a; with the group 63–63a being associated with the ODD multiplexer switches 60–60a and group 64–64a being associated with the EVEN multiplexer switches (not shown). There are seven AND gates in each of the groups 63–63a and 64–64a, corresponding to the seven data words contained in each data block, and each AND gate is connected to receive a different one of the C1–C7 outputs from counter 62. At the AND gates 63–63a and 64–64a, the C1–C7 outputs from counter 62 are gated with a half-cycle long pulse level ODD or EVEN from the half-cycle counter 54 of FIG. 4a, for example, to produce seven successive enabling pulses for the seven multiplexer switches in the selected odd or even set; i.e., depending upon whether the odd integrators 59 or the even integrators (not shown) are to be connected to the buffer amplifiers 22 and 23 of FIG. 4c. For example, when multiplexer switch 60 is enabled, by AND gate 63, it applies the output voltage from the integrating capacitor pair for data word No. 1 to the buffer amplifiers 22 and 23, over wires 65 and 65a.

At the end of each 155 microsecond C pulse output from counter 62, the integrated data word inputs are removed from the buffer amplifiers 22 and 23 (see FIG. 4c) and the 5 microsecond CP pulse then closes a reset switch 66, connected between the buffer amplifier input lines 65–65a and ground, which discharges the stray capacitances of the input lines to ground. Moreover, the trailing edge of this CP pulse is utilized, in FIG. 4b, to advance the count of the C pulse generator 62 and thereby gate the next pair of integrating capacitors 58a and 58b, for word No. 2, through the corresponding multiplexer switch of group 60–60a to the buffer amplifiers 22 and 23. After pulse output C7 has been generated, the next CP pulse resets the three-bit counter 62 to zero, at which count it remains until the next zero crossing of the reference AC voltage occurs to generate a conversion start CS pulse.

Pulse CE in FIG. 6 demarcates the end of the conversion period for each data block and is generated, simultaneously with the resetting of the three-bit counter 62, by any suitable circuitry (not shown). The CE pulse is used to reset or discharge all of the integrating capacitor pairs 58a–58b (see FIG. 4b) in the set just sampled. More specifically, after each odd numbered data block (No. 1, 3, 5 or 7) has been sampled by buffer amplifiers 22 and 23, so that the ODD pulse level is in existence, the CE pulse is gated through AND gate 67 to a plurality of integrator reset switch pairs 68a and 68b, associated with the integrating capacitor pairs 58a and 58b. Similarly, the AND gate 69 receives the CE pulse, together with the EVEN pulse level from half-cycle counter 54 (in FIG. 4a), after each even numbered data block has been sampled, and applies the CE pulse to those reset switches connected across the integrating capacitor pairs in the even integrator set (not shown).

ANALOG TO DIGITAL CONVERSION

As mentioned previously, the DC voltage pairs (data and reference or sin and cos ) that are obtained by integrating each analog input word to the system of the present invention are applied in sequence to the buffer amplifier pair 22 and 23 (see FIG. 4c) for 155 microseconds. During this period, in a manner to be described in more detail hereinafter, these DC analog voltages are converted to a corresponding digital word which is then transferred, via an 18-bit buffer register 28 and level converters 29 shown in FIGS. 4d and 2, to the digital computer. If the input word that is to be converted into digital form is a synchro data word, the DC output voltages applied to the buffer amplifiers 22 and 23 are proportional to the sine and cosine of the synchro shaft angle $\theta$. These synchro voltages are initially converted to a 10-bit word of which three bits are the octant code and seven bits represent either the tangent or cotangent of the shaft angle $\theta$, depending upon which quantity is less than unity. On the other hand, if an AC data word is to be converted, the buffer amplifiers 22 and 23 receive DC voltages proportional to the input data and the AC reference voltages respectively. These voltages also are converted to a 10-bit word, of which one bit designates the algebraic sign of the input data word and nine bits represent the fractional ratio of the data and reference voltages.

Figure 4D:
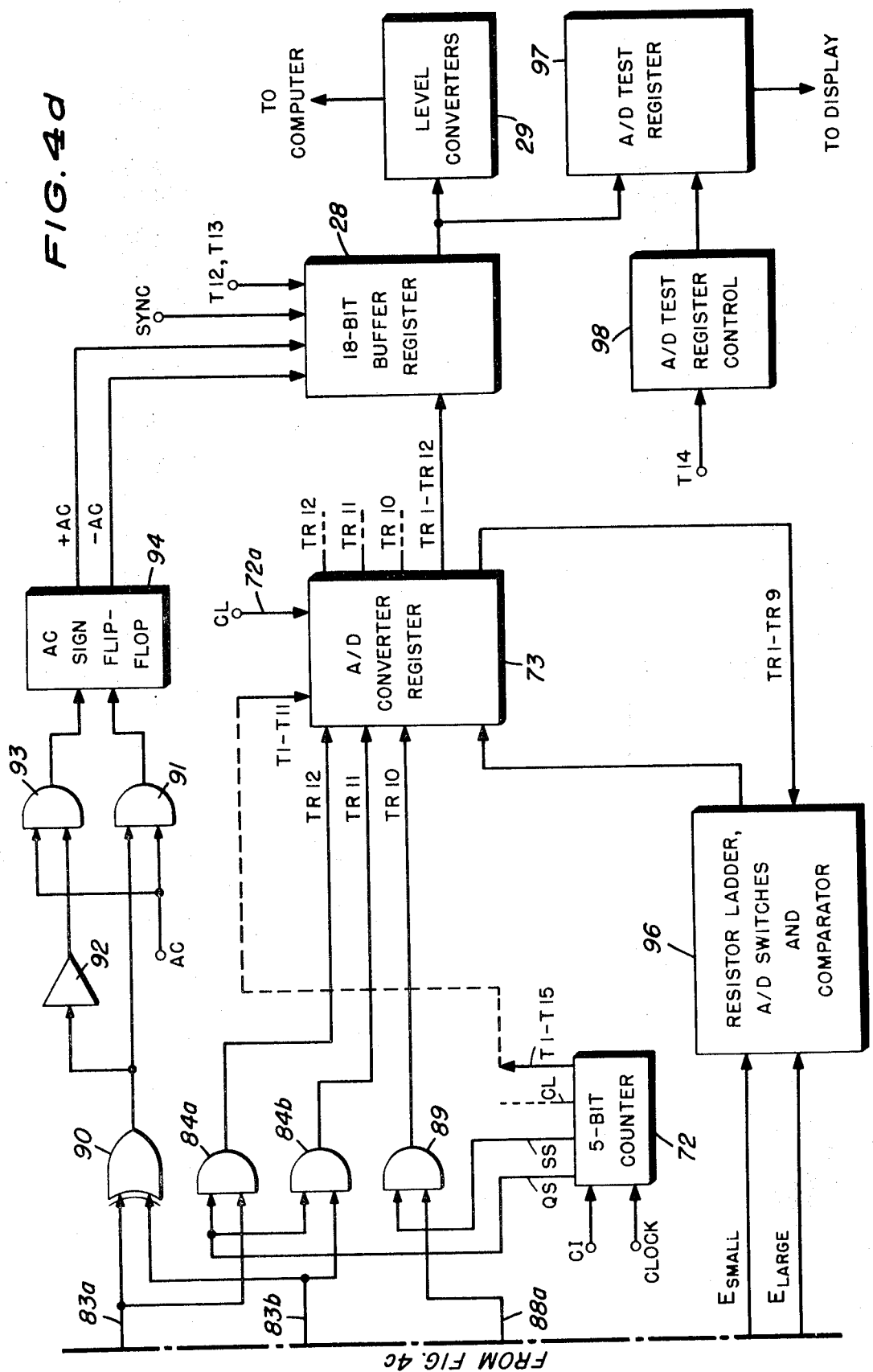

Timing for the analog to digital conversion operation is controlled by a 5-bit binary counter 72, shown in FIG. 4d, capable of generating 32 equal interval counts during each 160 microsecond conversion period, as are represented in FIG. 7 and numbered 0 to 31. This counter 72 remains enabled throughout the conversion period by a signal CI (conversion interval) applied thereto from suitable timing pulse generating circuitry (not shown), while the count is advanced by suitable clock pulses. The first half (80 microseconds) of the conversion period is used for quadrant and sector determination for synchro data words or for sign determination for AC data words; whereas, the conversion proper and transfer of the resultant digital word to the digital computer are performed during the second half of each conversion period. As noted in FIG. 7, the 32 counts produced by the 5-bit counter 72 are decoded to produce specific signals and timing pulses, designated as CL, QS, SS and T1–T14. More particularly, at the beginning of each conversion period, signal CL (clear register) is the first pulse produced at 5-bit counter 72 and it is applied on wire 72a in FIG. 4d to clear the analog to digital converter register 73 of its previous contents and make it ready to convert a new analog input word into a digital code.

Quadrant determination for input synchro words is accomplished by checking the polarity of the DC voltages representing sine and cosine of the synchro shaft angle $\theta$, at the output of the buffer amplifiers 22 and 23, in FIG. 4c. In other words, each combination of signs uniquely defines one quadrant for the synchro shaft angle $\theta$. More specifically, the DC voltage outputs from the buffer amplifiers 22 and 23 are applied to voltage comparator circuits 74a and 74b respectively which compare these voltages with ground and develop binary outputs, the values of which depends upon whether the sin $\theta$ and cos $\theta$ voltages are positive or negative. In this regard, it should be noted however that the signs of input data and synchro words integrated during a negative half-cycle of the reference voltage are inherently inverted and therefore, in order to correctly ascertain the sign of such voltages, it is necessary that they be inverted again. For example, if the first data block is integrated during a positive half-cycle of the reference voltage, even numbered data blocks are integrated during negative half-cycles and consequently, the signs of the words in even numbered data blocks must be inverted. Similarly, the signs of all words in odd numbered data blocks must be inverted if the first data block is integrated during a negative half-cycle of the reference voltage. More specifically, the outputs from the comparators 74a and 74b are applied to AND gates 75 and 76 directly and to AND gates 77 and 78 through inverters 79 and 80, along with gating levels A and B necessary for performing sign determination. Signal A is true only when the signs are not inherently inverted and signal B is true when they are inverted and, therefore, must be inverted again. These signals A and B are produced by conventional circuitry (not shown) in a manner well-known in the art of data conversion; e.g., in response to the outputs of half-cycle counter 54 and the zero crossing detector unit 50. The outputs of the AND gates 75 through 78 are applied to a pair of OR gates 81 and 82 and produce quadrant determining output signals, on lines 83a and 83b. These two quadrant determining signals are then gated through AND gates 84a and 84b (see FIG. 4d), by signal QS from the 5-bit counter 72, to flip-flop stages TR11 and TR12 in the analog to digital converter register 73.

The DC output voltages from the buffer amplifiers 22 and 23 of FIG. 4c are also applied both directly and through inverter amplifiers 85 and 86, to analog switches 87, along with the outputs of the flip-flop stages TR11 and TR12 of the analog to digital converter register 73 of FIG. 4d. These analog switches 87 may be of conventional design such as is shown in and described in detail at pages 84 through 92 of Field-Effect Transistors, by L. J. Sevin, Jr., copyright 1965 by Texas Instruments Inc. and operate in a conventional manner to develop DC output voltages that represent the absolute values of the sine and cosine of the shaft angle (/sin$\theta$/and/cos$\theta$) and the negative of the absolute value of the sine of the shaft angle (−/sin$\theta$/). For sector determination, the negative of the absolute value of the sine of the shaft angle (−/sin$\theta$/) is algebraically added to the absolute value of the shaft angle cosine (/cos$\theta$/), at comparator circuit 88, and the result (on wire 88a) is gated through AND gate 89 and into flip-flop TR10 of the A/D converter register 73, by signal SS from the 5-bit counter 72 (see FIGS. 4d and 7). Together, the three flip-flops TR10, TR11 and TR12 thus digitally define the octant of the synchro shaft angle $\theta$.

The sign of the AC data input depends upon the phase relation between the AC input data voltage and the AC reference voltage. If the two voltages are in phase, the sign of the data is considered positive; whereas, if they are 180° out of phase, the sign of the data is negative. Sign determination for each AC data input is accomplished with the same logic circuitry used for synchro quadrant determination. More specifically, the outputs from the OR gates 81 and 82, in FIG. 4c, are applied to an EXCLUSIVE OR gate 90 which produces an output only when the two inputs are of different polarity and no output when the inputs are the same polarity. The output from the EXCLUSIVE OR gate 90 is connected, on the one hand, directly to an AND gate 91 and, on the other hand, through an inverter amplifier 92 to an AND gate 93. The AND gates 91 and 93 respond to the inputs from EXCLUSIVE OR gate 90, upon reception of pulse level AC which is generated whenever AC data is to be converted, and selectively control flip-flop circuit 94 to produce either of two outputs to the 18-bit buffer register 70, indicative of the sign of the AC data input word. Because the amplitude of the AC data voltage can never exceed the AC reference, the output of AND gate 89 and consequently the state of flip-flop TR10 in A/D converter register 73, of FIG. 4d, is the same for all AC data inputs.

The DC voltages representing the absolute values of sin $\theta$, cos $\theta$, AC data and AC reference, as produced at analog switches 87, are applied to analog switches 95 which are controlled by flip-flop TR10 in such a manner that the voltage with the larger absolute value becomes the output designated $E_{LARGE}$ and the voltage with the smaller absolute value becomes the output designated $E_{SMALL}$. These $E_{LARGE}$ and $E_{SMALL}$ voltages are used, in a method of successive approximations, to produce a digital word with a binary value equal to $E_{SMALL}/E_{LARGE}$. For synchro inputs, this digital word represents the absolute value of either the tangent or cotangent of the synchro shaft angle $\theta$, whichever is less than unity; whereas, for AC inputs, the digital word represents merely the fractional ratio of (/DATA///REF/). By using the ratio of these voltages $E_{SMALL}$ and $E_{LARGE}$, the analog to digital conversion process is made independent of variations in the system voltage amplitude.

For the method of successive approximation used in the data conversion and control apparatus of the present invention, the signal $E_{LARGE}$ is applied to a resistor ladder, contained in the circuit block 96 of FIG. 4d, as a reference voltage and the signal $E_{SMALL}$ is then compared with varying fractional portions of this reference voltage. The successive approximation operation performed by and the circuitry contained within the block 96 are well-known to those skilled in the art of data conversion, as is shown and described in detail at pages 18 through 22 of Data Conversion Circuits and Subsystems, copyright 1964 by Computer Control Co. Inc., Framingham, Mass. More particularly, the specific fraction of the reference voltage used in the comparison at any one time, corresponds to the value of the binary word then registered on the flip-flops TR1 through TR9 contained in A/D converter register 73. For example, when the comparison begins, flip-flops TR1 through TR9 are all in the zero state and, at the time T1 (see FIG. 7), the flip-flop TR9 is set by the T1 pulse from 5-bit counter 72 to cause the voltage $E_{SMALL}$ to be compared with 0.5 or one-half of $E_{LARGE}$. If $E_{SMALL}$ is less than 0.5 $E_{LARGE}$, flip-flop TR9 is reset at time T2; whereas, if $E_{SMALL}$ is greater, an inhibit level from the converter comparator, in block 96, prevents TR9 from being reset. The comparator 96 thus includes digital logic elements, well known to those skilled in the art, to provide necessary gating and steering. Also at time T2, flip-flop TR8, which has a binary weight of 0.25 is set and causes voltage $E_{SMALL}$ to next be compared with a portion of the reference voltage $E_{LARGE}$ determined by the combined states of TR8 and TR9; i.e., either 0.25 $E_{LARGE}$ or 0.75 $E_{LARGE}$, depending upon whether TR9 was reset as a result of the first comparison. In this manner, the voltage $E_{SMALL}$ is successively compared to varying fractional portions of the reference voltage $E_{LARGE}$ and the associated flip-flops TR1 through TR9 are controlled in such a manner that, after time T10, there is stored in the analog to digital converter register 73, a 9-bit digital word with a binary value equal to the ratio of $E_{SMALL}/E_{LARGE}$. At time T11, the octant code stored in flip-flops TR10 through TR12 is changed, if necessary, to a different format acceptable to the digital computer, if a synchro word has just been converted.

The 18-bit buffer register 28 is cleared at time T12 and a new data word is gated into it from the analog to digital converter register 73 at time T13, as noted in FIG. 7. If the word 3,609,312 contained in register 73 is a synchro data word, as indicated by the SYNC input to buffer register 28, then the outputs of TR10 through TR12 are transferred to bits $2^0$ through $2^2$ of the buffer register 28 and the synchro tangent or cotangent data are truncated or cut down to a 7-bit code; i.e., the two least significant bits of the converter register 73 (TR1 and TR2) are discarded and the outputs of TR3 through TR9 are transferred to bits $2^3$ through $2^9$ of the buffer register 28. Bits $2^{10}$ through $2^{17}$ of the buffer register 28 are unused for synchro words and therefore remain in the zero state. Conversely, neither positive nor negative AC data words use bits $2^0$ through $2^7$ of the buffer register 28; i.e., for AC words these eight bits remain in the zero state. For positive AC words, the 9-bit ratio code stored in flip-flops TR1 through TR9 of converter register 73 is transferred to bits $2^8$ through $2^{16}$ of buffer register 28. The most significant bit, $2^{17}$, serves as the sign bit and remains in the zero state to indicate a positive AC word. For negative AC words, the 1's complement of the data word ($\overline{TR1}$ through $\overline{TR9}$) is transferred to the buffer register 28 and the sign bit, $2^{17}$, is set to a one to indicate a negative word. The outputs of the buffer register 28 are applied directly to a set of level converters 29 which insure that the digital code applied to the computer is at the proper voltage levels.

As shown in FIG. 4d, the output digital code from the 18-bit buffer register 28 is also connected to A/D test register 97, for display on suitable indicators (not shown), so that the operator can selectively monitor portions of the data stream being transferred to the digital computer. The test register 97 is a conventional unit comprising a flip-flop storage register, for example, such as is shown an described at pages 25 and 26 of the Manual entitled Digital Flip Chip Modules, copyright 1965 by Digital Equipment Corp., Maynard, Mass. The actual selection of the data function for display is controlled by a pulse generated by control unit 98 when enabled at time T14.

ANALOG SUBSECTION TO COMPUTER COMMUNICATIONS

As mentioned previously, a converted analog word is loaded into the 18-bit buffer register 28 (see FIG. 4d) at time T13 and immediately appears on the input data lines connected to the digital computer. Moreover, two control lines (not shown) extend between the analog subsection of the input section and the computer; one being used to notify the computer, say at time T14, that an input data word is available for transfer, and the other being used for subsequently transmitting a signal from the computer to the input section to acknowledge the transfer. In the even that the computer is unable to accept a new input word from the buffer register 28, before the next word is converted, it is necessary to interrupt the normal operation of the input section by initiating a hold condition wherein the input section remains quiescent until the computer notifies the input section that it is ready to receive new data.

DIGITAL INPUT SUBSECTION

As previously mentioned, when describing FIG. 2 of the drawings, the input section of the proposed data conversion and control system also includes a digital subsection which is shown in detail in FIGS. 5a through 5c and which processes input digital data for the computer. More specifically and by way of example, four input digital words have been illustrated in the drawings and are designated as digital words No. 1, No. 2 and No. 3 and an fr word. Words Nos. 1-3 might, for example, represent various conditions (relay and switch closures) in the missile fire control system and/or the data conversion and control apparatus of the present invention. In processing the three digital input words No. 1 through No. 3, the digital subsection samples in parallel all input sources represented in each word; while the words themselves are produced in serial fashion.

Referring now to FIG. 5a, digital input words are applied to AND gates 100 through 103 respectively, for application, via OR gate 104 to an 18-bit buffer register 30 (see also FIG. 2) similar to that utilized in and previously described for the analog input subsection. From the output of the 18-bit buffer register 30, a digital code of proper format corresponding to the input word is applied through suitable level converters (not shown) to the digital computer.

The digital computer requests input digital words No. 1 through No. 3 at a rate of once every 94 milliseconds, for example. To request these three words, the computer transmits an external function word to the output section shown in FIG. 3, as previously discussed, and the output section responds by transmitting a START DIGITAL INPUT SEQUENCE signal to the digital subsection. Upon receipt of this start command, at input line 107 in the upper left-hand corner of FIG. 5a, the digital subsection begins processing digital words No. 1 through No. 3, provided that an fr word is not then also ready for transfer to the digital computer. In other words, if an fr word is ready for transfer, when the START DIGITAL INPUT SEQUENCE signal is received, processing of words No. 1 through No. 3 will be delayed slightly until the digital computer acknowledges the fr word by resetting the fr sequence flip-flop 108 of FIG. 5a as will be described in more detail hereinafter.

Upon receipt of the START DIGITAL INPUT SEQUENCE signal, the digital sequence flip-flop 109 in FIG. 5a is set to its binary one state. This, in turn, is effective to enable AND gate 110, provided that the fr sequence flip-flop 108 is in its condition. The output from AND gate 110 then actuates single-shot multivibrator 111, OR gate 112 and single-shot multivibrator 113 to produce a pulse which operates a 2-bit counter 114 to its number one count position wherein it produces an output pulse on line 115 which enables the gate 100 and thereby causes application of the No. 1 digital word, via OR gate 104, to the 18-bit buffer register 30 of FIG. 5a. Simultaneously with the opening of AND gate 100, the enabling signal appearing at output 115 of the 2-bit counter 114 is applied, through OR gate 116 and level converter 117, to the digital computer as an IDR (input data request) signal which notifies the computer that the digital word is available.

As soon as the digital computer accepts this No. 1 digital word from the buffer register 105, it generates an IA (input acknowledge) signal which is applied, at input line 118 in FIG. 5a, to a single-shot multivibrator 119 which, in turn, pulses AND gate 120 in time coincidence with the output of the OR gate 116. Consequently, the 2-bit counter 114 is advanced to its number two count position, wherein it energizes output line 121 with an enabling signal which opens the AND gate 101 and thereby applies the No. 2 digital word, through the OR gate 104, to the 18-bit buffer register 30. Similarly, after this second digital word has been accepted by the computer, the 2-bit counter 114 is advanced to its third count position wherein output line 122 is enabled to thereby gate the No. 3 digital word through AND gate 102. The input acknowledge (IA) signal generated by the computer, upon acceptance of the No. 3 digital word, advances the 2-bit counter 114 to its zero count position; i.e., it resets the counter. As a result, output line 123 is energized to reset the digital sequence flip-flop 109 and thereby terminate the input digital sequence, until another START DIGITAL INPUT SEQUENCE signal is received on input line 107 from the output section of FIG. 3.

Having thus described the operation of the input section of the data conversion and control system of the present invention, attention will now be turned to the output section shown in FIG. 3 of the drawings and its operation will be described in somewhat more detail, by making use of the timing pulse waveforms of FIG. 8.

COMPUTER TO OUTPUT SECTION COMMUNICATIONS

The two channels A and B of the output section of FIG. 3 are connected to separate output channels of the digital computer. More specifically, channel A, which converts only data words, is connected by eighteen data lines and two control lines to the computer. One control line is used to transmit output data request (ODR) signals from channel A to the digital computer; whereas, the other control line is used to transmit output acknowledge (OA) signals from the computer back to channel A. Channel B, on the other hand, converts both data words and external function words and is connected to the digital computer by eighteen data lines and four control lines. Two of these control lines are used to transmit ODR and OA signals and the two additional control lines are used to transmit external function request signals (EFR) from channel B to the computer and external function acknowledge signals (EFA) from the computer back to channel B. All of these lines are equipped with interface elements that convert the signals from the logic levels used by one system to the logic levels used in the other.

OUTPUT SECTION CONTROL LOGIC

The transfer of computer output digital words (both data words and external function words) to either channel of the output section is performed under joint control of the digital computer and the control logic unit 40 or 40' of the respective channel. The contents of the control logic units 40 and 40', as well as the other requirements for interfacing between the Univac 1218 computer and the conversion apparatus of the present invention (both input section 11 and output section 12), are described in detail at pages 11 through 13 in the above-mentioned Univac Manual entitled On Input/Output Design Characteristics for Univac Defense Computers. During the period that the digital words are being used, they are transmitted to the output section of FIG. 3 once every 94 milliseconds, for example. The timing and overall functions are identical for channels A and B except that channel B accepts both data words and external function words; whereas, channel A handles only data words. As previously mentioned, data words consist of digital information that is to be converted to analog data; whereas, external function words consist of digital information that is to be converted to command and control signals. Because the transfer of words is performed in a similar manner for either channel A or B, an explanation is provided of word transfers to channel B only and, in this connection, it should be noted that the waveforms of FIG. 8 represent an idealized timing diagram for word transfer to channel B or FIG. 3.

More specifically, channel B indicates its readiness to accept an output word, either an output data word or an external function word, from the digital computer by causing both the ODR and EFR signals to become true as is represented, in FIG. 8, by both signals being initially at a "1" level. Assuming that a data word is to be transferred to channel B, the digital computer places a data word on the output data lines (as represented by the third waveform from the top in FIG. 8) and notifies channel B control logic unit 40' by causing signal OA to become true. In response, the control logic 40' causes signal ODR to become false, say for 10 microseconds, and signals CLEAR BUFFER B and ENABLE DATA CHANNEL B to become true. Signal CLEAR BUFFER B resets all flip-flops in the buffer register 35' and signal ENABLE DATA CHANNEL B gates the word on the data lines through the level converters 33' and OR gates 34' and into buffer register 35'. Although both of these signals become true at the same time, signal ENABLE CHANNEL B, which is say of 10 microsecond duration, produces no effect at buffer register 35' until the shorter (5 microseconds, for example) CLEAR BUFFER B signal becomes false. After the data word has been loaded into buffer register 35', signal ENABLE MATRIX B becomes true and, together with signals OA-TPA and EFA-TPA, is used in address determination, as will be described in more detail hereinafter, to decide exactly where this data word will ultimately be transmitted. Throughout the foregoing operation, it should be noted in FIG. 8 that signal OA-TPA remains true and its complement, signal EFA-TPA, remains false because a data word, rather than an external function word, has been received from the computer. After signal OA becomes false again, the computer output word is removed from the data lines and channel B is then ready to accept another word.

The transfer of an external function word from the digital computer to channel B is effected in much the same manner as that just described for the transfer of a data word, including use of the same timing pulses (see FIG. 8). Consequently, the lower portion of FIG. 8 illustrates only those timing signals that are different during the transfer of an external function word. More specifically, signal EFA, rather than signal OA, is true to notify the control logic unit that an external function word is to be transferred; signal EFR, rather than signal ODR, becomes false; and signal EFA-TPA is true and signal OA-TPA is false, to permit address determination of the external function word.

ADDRESS DECODERS

The diode matrices and address transfer gates associated with each of the output channels A and B, in FIG. 3, operate as means for transferring each output word from the computer to an appropriate set of output flip-flops 38, 38', 39 or 41, depending upon the ultimate destination of that word. More specifically, a group (five, for example) of the least significant bits in the digital output word transferred to the 18-bit buffer register 35' contains the address of the particular set of flip-flops to which the data portion of the word is to be transferred. This address portion of the output word from the computer is applied, as shown in FIG. 3, to the diode matrices 36' and subsequently control the address transfer gates 37' to produce transfer pulses which select the proper converter or set of flip-flops. The matrices 36 and 36' and the transfer gates 37 and 37' associated with the two output channels shown in FIG. 3 are conventional apparatus and operate in a well-known manner, as is described in detail at pages 547 through 552 of Digital Computer and Control Engineering, by R. S. Ledley, copyright 1960 by McGraw-Hill Book Company Inc. In FIG. 3, it will be noted that the data output portion of the 18-bit buffer register 35' is applied in parallel to the inputs of all flip-flop sets in channel B, but, the transfer gates 37', under the control of the address portion of the output word, permits the data to be gated into only the addressed converter or flip-flop set.

It should also be noted in FIG. 3 that the input sequence start commands produced by the output section of the proposed data conversion and control apparatus of the present invention are generated directly from the output of address transfer gates 37'; i.e., the transfer pulses which are normally used to gate the data portions into the flip-flops and digital to analog switches, are used instead as the input sequence start commands. Any data portions associated with these external function words are thus disregarded. As previously discussed, the input sequence start command signals are used to start the input section conversion processes in both the analog and digital subsections.

DOPPLER FREQUENCY (fr) CONTROL

As mentioned previously, the data conversion and control system of the present invention includes means for providing closed-loop control over the so-called doppler frequency ($fr$) signal which is transmitted to the guided missile for the purpose of aiding the missile in acquiring its intended target, as is well known to those skilled in the art of guided missile control. Such missile might, for example, be of the Talos type which, during the first part of its flight, is a beam rider and which, as it approaches its target, switches over to homing guidance. The doppler frequency ($fr$) information is then transmitted to the missile by its tracking radar, several seconds before the beginning of the missile's homing phase to indicate the approximate relative velocity between the missile and target.

More specifically and in accordance with the present invention, the digital computer calculates this doppler frequency information and transmits it, as an output digital word, to the *fr* system of FIG. 5c where it is converted to a form acceptable by the missile tracking radar. This digital word transmitted to the *fr* system represents the rate of frequency change, labeled *d*(D*fr*) in FIG. 5c, necessary for reaching the desired frequency of the control signal to be transmitted to the missile. The output produced by the *fr* system and transmitted to the missile tracking radar, in response to this digital control word is an rf voltage, labeled *fr* VIDEO in FIG. 5c, the frequency of which varies linearly with missile-target relative velocity. A digital quantity, labeled simply *fr* in FIG. 5c, is also fed back from the *fr* system, through the input section, to the digital computer, as will be described in detail hereinafter, and thus forms a closed servoloop providing the digital computer with data necessary for further calculation of necessary changes in the doppler frequency control signal. Analog voltages representing both *fr* and its derivative D*fr* are recorded on suitable recorder mechanisms.

The *fr* system is actuated by an external function word applied by the computer to output channel B, in FIG. 3, and which causes an *fr* START/STOP signal to become true (see FIGS. 5b and 5c). This *fr* START/STOP signal is applied to the reset relay 124, in FIG. 5c, over line 124a, and thereby enables integrator 125 to integrate the *d*(D*fr*) signal subsequently applied thereto via flip-flop sets contained in converter unit 38' of FIG. 3 and resistor ladder 126. As mentioned previously, this *d*(D*fr*) signal represents the rate at which the frequency of the doppler or *fr* signal must be changed in order to reach the desired frequency and is in the form of a voltage (at the output of resistor ladder 126) whose magnitude is proportional to the digital word applied on input lines represented at 126a, in FIGS. 3 and 5c. The output of the resistor ladder 126 is applied to the integrator 125 which produces an output ramp voltage, the rate of change of which varies each time the digital computer provides a *d*(D*fr*) word with a different value. The integrator output voltage is then used to control a voltage controlled oscillator 127 which produces square output pulses, at a frequency dependent upon its input voltage. For example, the voltage controlled oscillator 127 might have a center frequency; i.e, with zero input voltage, of 435 kc. and might vary its frequency 5 kc. per input volt. The output of the VCO is subsequently applied, via driver circuit 128, to the missile tracking radar of the fire control system 13, the input section 11, and suitable recorders 12a, as illustrated in FIG. 1.

More specifically, one output of the driver circuit 128 is connected to a low-pass filter and voltage amplifier network 129 which converts the square pulse train into a nearly sinusoidal output voltage of corresponding frequency. The response curve for this low-pass filter is preferably flat over a predetermined frequency range, for example, from 415 kc. to 480 kc., encompassing the possible output frequencies of voltage controlled oscillator 127. The output from the low-pass filter and voltage amplifier unit 129 is applied to unit 130 containing suitable power amplifiers driving an isolation transformer which provides grounding isolation for the tracking radar. The resultant *fr* VIDEO signal is applied to the missile tracking radar via a suitable relay complex 131, used to disconnect the tracking radar when ordered by a suitable control pulse.

The driver 128 also feeds its output signal *fr* to a suitable combined flip-flop and low-pass filter circuit 132, whose flip-flop divides the frequency of the input square wave pulses by two and applies the result to the low-pass filter of unit 132 which produces a low level sinusoidal voltage that is subsequently amplified at 133. The output of the amplifier 133 (which incidentally would be 217.5 kc. if the VCO is operating at center frequency), is applied as input, together with the output (for example, 201.5 kc.) of a crystal controlled oscillator 134, to a suitable diode mixer and low-pass filter network 135 where these two signals are combined and the low-pass filter portion of the unit 135 then passes the difference frequency, $f = 16 kc. + \delta f_{vco}/2$, where $\delta f_{vco}$ is the deviation (+ or −) in the frequency output of voltage controlled oscillator 127, from its nominal center frequency of 435 kc.

This output signal from the low-pass filter 135 is amplifier, at 136, and is then used to operate a single-shot multivibrator contained in unit 137. Consequently, as the frequency of the *fr* signal increases, at the output of driver 128, the triggering rate of the single-shot multivibrator 137 and therefore the number of output pulses which it produces in a given time period also increases. Since the width of the pulses produced by this single-shot remains substantially constant, the amplitude of the output voltage from the low-pass filter portion of unit 137 varies linearly with the number of times that the single-shot multivibrator portion of unit 137 is triggered in a given period; i.e., with the frequency of the *fr* signal generated at the voltage controlled oscillator 127.

The output voltage of the low-pass filter 137 and an opposite polarity or bucking voltage from the *fr* offset voltage divider 138 are summed in an operational amplifier 139 and then applied, via line 139a, to a suitable stylus-type recorder (not shown) which records the value of the *fr* signal. The signal output from the operational amplifier 139 is also differentiated at 140 and amplified at 141 to produce a D*fr* signal which is also recorded to indicate the rate of variation of the *fr* signal. More specifically, the offset voltage from unit 138 is introduced to prevent overdriving the stylus of the recorder to which the *fr* signal is applied; i.e., when the voltage controlled oscillator 127 is operating at the frequency corresponding to the position of the *fr* centering switch 142, the output of the operational amplifier 139 is approximately zero volts and the stylus of the recorder is centered.

As previously mentioned, when the digital computer desires an *fr* input word, the *fr* START/STOP signal becomes true and, in addition to actuating the reset relay 124 in FIG. 5c, is also applied simultaneously to AND gates 143 and 144 and single-shot multivibrator 145, in FIG. 5b. The output from the single-shot multivibrator 145 is applied to an OR gate 146 which presets 13-bit counter 147 to a predetermined count value (to insure that the counted frequency will lie within the counter's range) and also permits the next clock pulse applied on line 147a to set the *fr* count flip-flop 148.

More specifically, the *fr* START/STOP control signal, when true, also actuates the single-shot multivibrator 149 and OR gate 150 and thereby sets the flip-flop 151 to its binary one state wherein the AND gate 144 now receives two of its three inputs. Subsequently, the next clock pulse on line 147a triggers single-shot multivibrator 152 and thereby supplies the last input condition required for the operation of AND gate 144. AND gate 144 now sets the *fr* count flip-flop 148 to its binary one state wherein AND gate 153 is enabled and applies the input clock pulses to a 4-bit counter 154. When the ninth clock pulse is received, counter 154 produces an output pulse which resets the *fr* count flip-flop 148.

Assuming that the clock rate is 100 pulses per second, the binary one output from the *fr* count flip-flop 148 thus remains true for 90 milliseconds. This 90-millisecond pulse is applied, on the one hand, to AND gate 155 and thus allows the *fr* square wave signal from the driver 128 of FIG. 5c, to be applied to the 13-bit counter 147 for 90 milliseconds, over line 155a. This, in turn, causes the final count of the 13-bit counter 147; i.e., at the end of the 90 millisecond pulse interval, to be indicative of the output frequency of the voltage controlled oscillator 127 of FIG. 5c.

On the other hand, the binary one output signal from the *fr* count flip-flop 148 is applied through single-shot multivibrator 156, as one input to the AND gate 143. The other input to the AND gate 143, as previously mentioned, is the *fr* START/STOP signal. Consequently, the AND gate 143 is rendered effective to trigger single-shot multivibrator 157 and thereby set the *fr* sequence flip-flop 108 in FIG. 5a with a so-called *fr* READY signal, applied over line 157a. At the same time, the output of the single-shot multivibrator 156 resets the 4-bit counter 154.

When the *fr* sequence flip-flop 108 of FIG. 5a is set, the AND gate 158 is enabled, provided that the digital sequence flip-flop 109 is then in its reset or binary zero condition. The single-shot multivibrator 159 is then triggered to generate an

*fr* query signal which is applied to AND gate 103 for the purpose of gating the *fr* word, on line 159a, from the 13-bit counter 147, of FIG. 5b, into the 18-bit buffer register 30, via OR gate 104, for subsequent transfer into the computer.

The output signal from single-shot multivibrator 159 is also utilized to generate two other signals which are applied to the digital computer: the first is a signal designated INT which is generated by single-shot multivibrator 160 and applied through level converter 161 and which indicates to the digital computer that the *fr* word is ready for transfer; and, a second signal designated as *fr* ACK which is also generated by single-shot 160 and which is fed as input to single-shot multivibrator 162 and OR gate 146 in FIG. 5b. OR gate 146 presets the 13-bit counter 147 to its predetermined count state, as previously described, while single-shot 162 pulses OR gate 150 and again starts the sequence that results in the development of the 13-bit *fr* word and the *fr* READY signal. In other words, a new *fr* word is started before the digital computer acknowledges receipt of the previous *fr* word by transmitting the signal IA, previously mentioned, which is received at input line 118, in FIG. 5a, and is applied in succession to single-shot multivibrators 119, 163 and 164.

The output of the single-shot multivibrator 164 is connected to the reset terminal of a flip-flop 165, whose set input is connected to the output of the single-shot multivibrator 159 so that the flip-flop is set when the so-called *fr* query signal is produced, as previously discussed. Subsequently, and before an output appears at the output of single-shot multivibrator 164, the AND gate 166 is momentarily enabled, by single-shot 163, to generate a reset pulse effective to reset the *fr* sequence flip-flop 108. With the *fr* sequence flip-flop 108 thus reset, the input section is capable of transferring the digital words No. 1 through No. 3 to the digital computer, until such time as the *fr* READY signal again becomes true.

SUMMARY

The data conversion and control system of the present invention establishes compatibility between an inherently analog missile fire control system and a general purpose digital computer. Moreover, the proposed system is implemented to possess the following desirable features: (1) input analog data is converted into digital form in such a manner that quadrature distortion and third harmonic noise are minimized and, moreover, integration and analog to digital conversion of analog data words occur on successive half-cycles of the AC reference signal so as to minimize overall conversion time; (2) the digital computer is connected in a closed-loop servo system for controlling the frequency of the so-called doppler (*fr*) control signal transmitted by the missile tracking radar to the guided missile, in such a manner that this doppler signal is more rapidly controlled with finer frequency resolution, over a continuous frequency band; and, (3) the proposed system can be operated in an end-around test mode whereby an operator can very rapidly check on its operation.

Obviously, many modifications, adaptations and alterations to the proposed data conversion and control system are possible in the light of the above teachings. Therefore, it should be understood that within the scope of the appended claims the invention may be practiced otherwise than as specifically described.

What is claimed is:

1. In a data conversion and control system, the combination of,
    a source of reference phase AC voltage,
    means connected to said reference voltage source for demarcating successive half-cycles of said reference voltage,
    input means for receiving input analog signals each comprising an AC voltage of reference phase whose amplitude represents the analog of a data source condition,
    integration means connected to said input means for integrating each of said input analog signals,
    analog to digital conversion means connected to said integration means for converting each of said analog signals into a digital signal subsequent to said integration, and
    control means connected to said integration means and said analog to digital conversion means and responsive to the successive half-cycles of said reference voltage demarcated by said demarcating means for rendering said integration means and said analog to digital conversion means selectively effective in succession, to first integrate and then perform an analog to digital conversion of each of said input analog signals on successive half-cycles of said AC reference voltage.

2. The combination specified in claim 1 further including,
    means operably connected to receive said AC reference voltage and generate a signal output demarcating a 120° period during each half-cycle of said reference voltage, and
    means connected to said 120° demarcating means and said integration means and responsive to the 120° demarcating signal output generated by said 120° demarcating means for rendering said integration means only effective to integrate an input analog signal for the 120° of said AC reference voltage signal demarcated by said signal output from said 120° demarcating means, whereby third harmonic noise distortion is minimized during integration of said input analog data signals.

3. The combination specified in claim 2 wherein said 120° demarcating means generates a signal output demarcating a 120° period occurring at the center of a half-cycle of said AC reference signal to thereby minimize quadrature distortion.

4. The combination specified in claim 1 wherein,
    said input analog signals are divided into a plurality of data blocks, each containing a plurality of data words,
    said integration means includes a plurality of integrating circuits corresponding with the number of data words in each data block and each of said integrating circuits being connected to receive and integrate a different data word, and
    said control means is a switching circuit connected to said half-cycle demarcating means and responsive to the successive half-cycle of said AC reference voltage signal for selectively applying the data words contained in one after another of said input data blocks to said integrator circuits on successive half-cycles of said AC reference voltage signal.

5. The combination specified in claim 4 wherein said switching circuit includes,
    counter means connected to said half-cycle demarcating means for registering a count of the half-cycles of said AC reference voltage signal, and means responsive to the count registered by said counting means for selectively connecting a different one of said input signal data blocks to said time integrating circuits each time said count advances.

6. The combination specified in claim 5 further including,
    second switching means connected between said integrator circuits and said analog to digital conversion means and responsive to the half-cycle count provided by said counter means for selectively connecting one after another of said integrating circuits to said analog to digital conversion means,
    each integrating circuit being connected to said analog to digital conversion means during the half-cycle of said reference signal immediately following the half-cycle during which said integrating circuit was connected to receive and integrate said input data signal.

7. The combination specified in claim 1 wherein said input analog signal may represent either synchro or data type information and further including,
    means controlled in accordance with the type of input analog signal received, for determining the octant of synchro type information and the algebraic sign of data type information.

8. The data conversion control system specified in claim 7 wherein said sign determining means comprises, first means operably connected to receive said input analog and reference signals for generating first and second output signals indicative respectively of the instantaneous polarity of said input analog and reference signals during each half-cycle of said reference signal, and second means operably connected to said first means to receive said first and second output signals for producing a signal indicative of the algebraic sign of said input analog signal, dependent upon the instantaneous phase relationship which exists between said input analog signal and said reference signal.

9. The data conversion and control system specified in claim 8 wherein said second means comprises an exclusive OR circuit adapted to receive said first and second output signals and adapted to generate an output signal only when said first and second signals are 180° out of phase.

10. In a data conversion and control system, the combination of, a digital computer, an input section connected to said digital computer and adapted to receive input data and convert said input data to a digital format usable by said digital computer, said input section being further effective to convert input data received in analog form into a digital form acceptable to said digital computer, an output section connected to said digital computer and adapted to receive digital control information from said digital computer and convert to analog signal form, said digital computer being programmed to generate a digital test signal and apply it to said output section for conversion to a corresponding analog signal, feedback means including a switch means in a first switching condition for interconnecting said output section and said input section for applying said test signal, after analog conversion by said output section, to said input section, said computer being programmed to compare the digital test signal generated by said computer with the input digitized signal furnished to said computer by said input section upon application of said converted test signal to said input section by said feedback means, and means operably connected to said comparing means for providing an error readout.

11. The data conversion and control system specified in claim 10 and further including, a missile fire control system, said switch means being effective when in a second switching condition to connect said output and input sections to said fire control system and being effective when in said first switching condition to disconnect said output and input sections from said missile fire control system and render said feedback means effective to connect said output section directly to said input section, said input section means receiving analog and digital data from said missile fire control system when said switch means is in its second switching condition and being effective to convert them to a digital format acceptable to said digital computer, and said output section means receiving digital output words from said digital computer and being effective to convert them to analog and digital formats acceptable to said fire control system.

12. The data conversion control system specified in claim 11 wherein said output section is provided with means permitting the manual insertion of selected data.

13. The data conversion and control system specified in claim 11 wherein said missile fire control system includes a radar unit for transmitting a variable frequency missile guidance control signal to a missile to be controlled and further including, a voltage controlled oscillator connected to said radar unit for generating said variable frequency missile guidance control signal, and interface apparatus for interconnecting said digital computer in a closed control loop to said voltage controlled oscillator, said interface apparatus comprising, digital-to-analog conversion means connected to receive an output digital control word from said digital computer indicative of any necessary adjustment in the output frequency of said voltage controlled oscillator for converting said digital control word into an analog voltage signal, means connecting said digital-to-analog conversion means to said voltage controlled oscillator for adjusting the frequency output of said voltage controlled oscillator in accordance with said analog voltage signal, means connected to the output of said voltage controlled oscillator for producing a digital word indicative of the output frequency being generated by said voltage controlled oscillator, and means for applying the digital word indicative of the output frequency of said voltage controlled oscillator to the input of said computer.

14. The apparatus specified in claim 13 wherein said digital word producing means includes a resettable, multibit counter means for storing a digital count representative of the output frequency of said voltage controlled oscillator.